US011238359B2

(12) United States Patent
Chen et al.

(10) Patent No.: US 11,238,359 B2
(45) Date of Patent: Feb. 1, 2022

(54) SIMPLIFIED QUANTUM PROGRAMMING

(71) Applicant: International Business Machines Corporation, Armonk, NY (US)

(72) Inventors: Richard Chen, Mount Kisco, NY (US); Shaohan Hu, Carmel, NY (US); Peng Liu, Yorktown Heights, NY (US); Marco Pistoia, Amawalk, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 947 days.

(21) Appl. No.: 15/874,489

(22) Filed: Jan. 18, 2018

(65) Prior Publication Data

US 2019/0220782 A1    Jul. 18, 2019

(51) Int. Cl.
| | |
|---|---|
| *G06N 5/00* | (2006.01) |
| *H04W 24/08* | (2009.01) |
| *B82Y 10/00* | (2011.01) |
| *G06F 1/02* | (2006.01) |
| *G06N 10/00* | (2019.01) |
| *G06F 17/16* | (2006.01) |

(52) U.S. Cl.
CPC ............ *G06N 10/00* (2019.01); *G06N 5/003* (2013.01); *G06F 17/16* (2013.01)

(58) Field of Classification Search
CPC ......... G06N 10/00; G06N 5/003; G06F 17/16
USPC ....................................................... 706/1–62
See application file for complete search history.

(56) References Cited

U.S. PATENT DOCUMENTS

| | | | | |
|---|---|---|---|---|
| 6,578,018 | B1 * | 6/2003 | Ulyanov ............... | B82Y 10/00 706/14 |
| 9,564,924 | B2 | 2/2017 | Heo et al. | |
| 2003/0169041 | A1 | 9/2003 | Coury et al. | |
| 2005/0224784 | A1 * | 10/2005 | Amin .................... | B82Y 10/00 257/14 |
| 2008/0109500 | A1 * | 5/2008 | Macready ............. | B82Y 10/00 708/2 |
| 2008/0238531 | A1 * | 10/2008 | Harris ................... | G06N 10/00 327/528 |

(Continued)

FOREIGN PATENT DOCUMENTS

CA          2921711          8/2017

OTHER PUBLICATIONS

Cook, The complexity of theorem-proving procedures, In Proceedings of the third annual ACM symposium on Theory of computing, ACM, May 1971, pp. 151-158.

(Continued)

*Primary Examiner* — Brandon S Cole
(74) *Attorney, Agent, or Firm* — Amin, Turocy & Watson, LLP

(57) ABSTRACT

Techniques facilitating simplified quantum programming are provided. In one example, a computer-implemented method comprises reducing, by a device operatively coupled to a processor, a first computing problem of a problem type to a second computing problem of the problem type, wherein the second computing problem is associated with a quantum circuit; facilitating, by the device, execution of the quantum circuit at a quantum computer, resulting in a first output corresponding to the second computing problem; and mapping, by the device, the first output to a second output corresponding to the first computing problem.

20 Claims, 11 Drawing Sheets

(56) References Cited

U.S. PATENT DOCUMENTS

| | | | | |
|---|---|---|---|---|
| 2009/0047677 A1* | 2/2009 | Frasch | ............... | G16B 40/00 |
| | | | | 435/6.18 |
| 2013/0144832 A1* | 6/2013 | Li | ............... | G06N 7/00 |
| | | | | 706/57 |
| 2014/0187427 A1* | 7/2014 | Macready | ............... | G06N 5/02 |
| | | | | 505/170 |
| 2016/0171368 A1* | 6/2016 | Aspuru-Guzik | ....... | G06N 5/003 |
| | | | | 706/46 |
| 2016/0338075 A1* | 11/2016 | McKibben | ............ | H04W 24/08 |
| 2018/0032896 A1* | 2/2018 | Fleischer | ............... | G06N 10/00 |

OTHER PUBLICATIONS

Karp, Reducibility among combinatorial problems, In Complexity of computer computations, 1972, pp. 85-103.

Grover, A fast quantum mechanical algorithm for database search, 1996, 8 pages.

Steinke, PBLib {A C++ Toolkit for Encoding Pseudo-Boolean Constraints into CNF, Feb. 23, 2015, 7 Pages.

Jones, et al., Implementation of a quantum search algorithm on a quantum computer, Nature, May 22, 1998, 6 Pages.

Grover, A framework for fast quantum mechanical algorithms, In Proceedings of the thirtieth annual ACM symposium on Theory of computing, 1998, 10 Pages.

Biham, et al., Grover's quantum search algorithm for an arbitrary initial amplitude distribution, Physical Review A 60, 1999, 5 Pages, No. 4.

Iriyama, et al., Generalized quantum Turing machine and its use to find an algorithm solving NP-Complete problem, 3rd International Symposium on Applied Sciences in Biomedical and Communication Technologies, 2010, 5 Pages.

Zhang, et al., Study of Test Suite Reduction Based on Quantum Evolutionary Algorithm, 2010 International Conference on Artificial Intelligence and Computational Intelligence, 2010, 5 Pages, vol. 2.

* cited by examiner

300

400

SIMPLIFIED QUANTUM PROGRAMMING

BACKGROUND

The subject disclosure relates to quantum computing, and more specifically, to techniques facilitating programming a quantum computer.

Physical limitations associated with classical computing technology have recently presented significant challenges to the continued advancement of computing technology. Thus, in recent years, the computing industry and academic community have turned to quantum computing technologies and ways to bring those technologies into reality.

In spite of the incoming wave of universal quantum computers on the horizon, quantum computing has not experienced a similar growth. Because quantum computing models behave in ways that are significantly different from their classical computing counterparts, conventional intuition and understanding of how computation systems work and how to design algorithms and softwares have been rendered unusable. Thus, in spite of half a century of research efforts on theoretical quantum computing, only a small set of quantum algorithms have been discovered. One such example is the Grover's Search algorithm, which is disclosed in Grover, "A framework for fast quantum mechanical operations." As disclosed by Grover, "a general technique for deriving a class of fast quantum mechanical algorithms" is given in which "[t]he idea is to first consider a single quantum mechanical operation, or a combination of such operations, due to which there is a certain probability for the system to reach a certain target state t." Subsequently, Grover discloses that "the probability of reaching the target state can be made to grow quadratically with the number of iterations by iterating the quantum mechanical operations in the prescribed way."

Further, from a software point of view, the ability to understand a simple piece of quantum program, let alone design and develop sophisticated tool stacks, is predicated upon a sufficient amount of background knowledge on quantum computing systems. In the current state of the art, such background knowledge cannot be assumed for most software engineering researchers and practitioners trained in classical computing technology.

In view of this disparity between the proliferation of quantum computers and quantum computing, it is desirable to bridge the accessibility and practicality gap surrounding quantum computing so that software engineering researchers and practitioners can be better prepared to reap their benefits as universal quantum computers become increasingly more available and powerful.

SUMMARY

The following presents a summary to provide a basic understanding of one or more embodiments of the invention. This summary is not intended to identify key or critical elements, or delineate any scope of the particular embodiments or any scope of the claims. Its sole purpose is to present concepts in a simplified form as a prelude to the more detailed description that is presented later. In one or more embodiments described herein, systems, computer-implemented methods, apparatus and/or computer program products that facilitate simplified quantum programming are described.

According to an embodiment, a system can include a memory that stores computer executable components and a processor that executes computer executable components stored in the memory. The computer executable components can include a reduction component that reduces a first computing problem of a problem type to a second computing problem of the problem type, where the second computing problem is associated with a quantum circuit. The computer executable components can further include an execution component that facilitates execution of the quantum circuit at a quantum computer, the execution of the quantum circuit resulting in a first output corresponding to the second computing problem. The computer executable components can additionally include a mapping component that maps the first output to a second output corresponding to the first computing problem. In certain embodiments, the problem type can belong to a class in which respective problems of the class are reducible to each other, e.g., a nondeterministic polynomial (NP)-complete problem type. In other embodiments, the computer executable components can further include an input mapping component that transforms an input of the first computing problem to an input of the second computing problem, where the input mapping component can enable generation of the input of the second computing problem independently of a level of knowledge of the second computing problem, or of quantum computing more generally, by a user of the system. The computer executable components can further include a construction component that generates configuration data for construction of the quantum circuit by the quantum computer, where the quantum circuit includes an oracle marking subcircuit and an amplitude amplification subcircuit. In certain embodiments, the construction component generates configuration data for the oracle marking subcircuit by converting respective elements of the second computing problem via at least one of Pauli-X quantum gates or N-th order controlled-not (CNX) quantum gates. The construction component can generate configuration data for a CNX quantum gate by combining a number N of controlled-controlled-not (CCX) quantum gates and respectively corresponding ancillary qubits. The construction component generates configuration data for the amplitude amplification subcircuit based on a transformation matrix. In certain embodiments, the input mapping component can map the input of the first computing problem to the input of the second computing problem based on a reduction mapping, and the computer executable components can further include an output mapping component that maps the first output to the second output based on the reduction mapping.

According to another embodiment, a computer-implemented method can include reducing, by a device operatively coupled to a processor, a first computing problem of a problem type to a second computing problem of the problem type, where the second computing problem is associated with a quantum circuit, facilitating, by the device, execution of the quantum circuit at a quantum computer, resulting in a first output corresponding to the second computing problem, and mapping, by the device, the first output to a second output corresponding to the first computing problem. In certain embodiments, the problem type can belong to a class in which respective problems of the class are reducible to each other. In other embodiments, the method can further include transforming, by the device, an input of the first computing problem to an input of the second computing problem. The method can generate, by the device, configuration data for construction of the quantum circuit by the quantum computer, where the quantum circuit includes an oracle marking subcircuit and an amplitude amplification subcircuit. In certain embodiments, the method can generate, by the device, configuration data for the oracle marking subcircuit by converting respective elements of the second computing problem via at least one of Pauli-X quantum gates or N-th order controlled-not (CNX) quantum gates. The method can also generate, by the device, configuration data for the amplitude amplification subcircuit based on a transformation matrix. In other embodiments, the method can further include mapping, by the device, the input of the first computing problem to the input of the second computing problem based on a reduction mapping, and mapping, by the device, the first output to the second output based on the reduction mapping.

According to a further embodiment, a computer program product for facilitating quantum programming can include a computer readable storage medium having program instructions embodied therewith. The program instructions can be executable by a processing component to cause the processing component to reduce a first computing problem of a problem type to a second computing problem of the problem type, where the second computing problem is associated with a quantum circuit, facilitate execution of the quantum circuit at a quantum computer, resulting in a first output corresponding to the second computing problem, and map the first output to a second output corresponding to the first computing problem. In certain embodiments, the problem type can belong to a class in which respective problems of the class are reducible to each other. In other embodiments, the program instructions can further cause the processor to map an input of the first computing problem to an input of the second computing problem based on a reduction mapping. The program instructions can also cause the processor to map the first output to the second output based on the reduction mapping.

DETAILED DESCRIPTION

Figure 1:
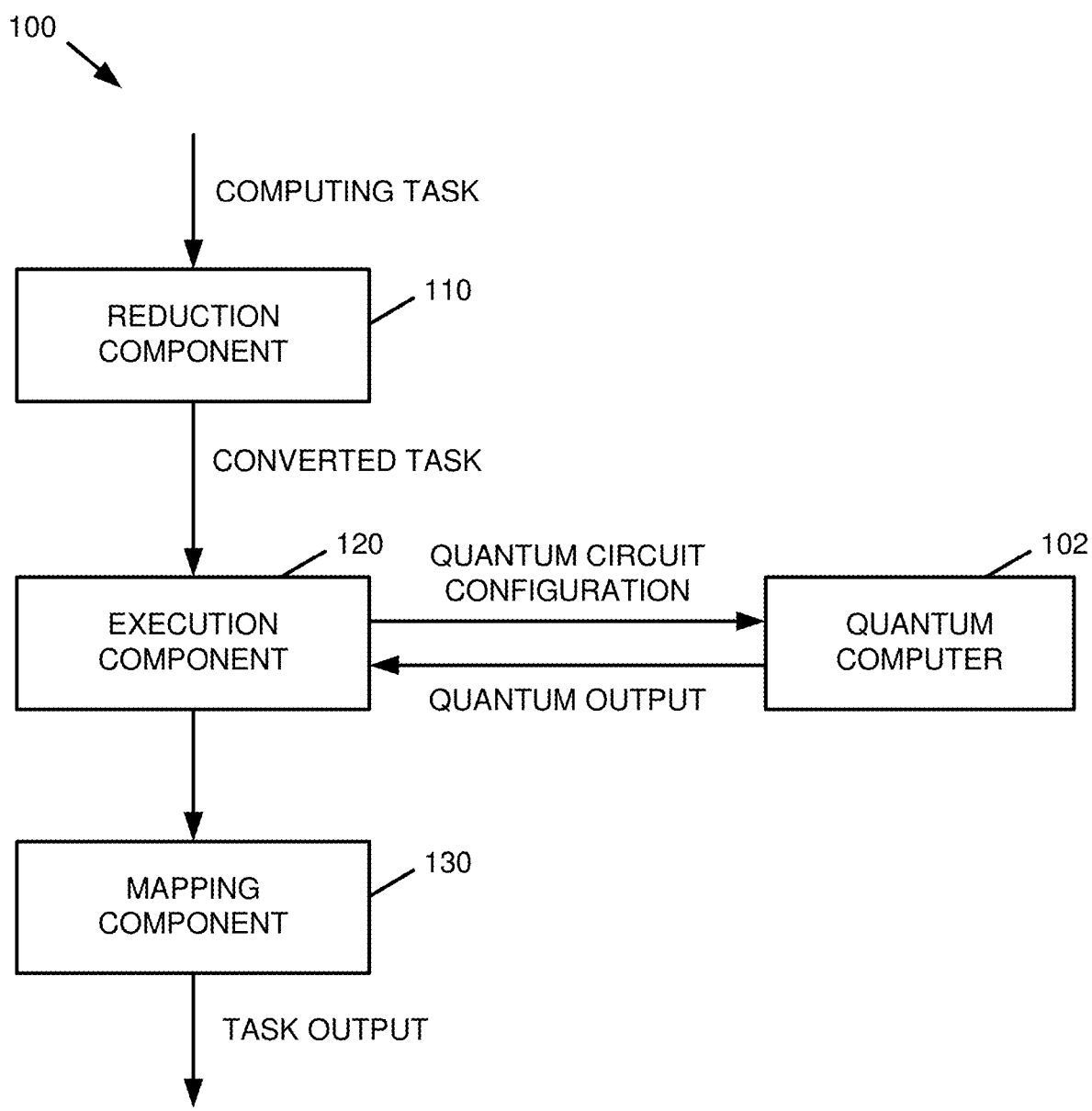
FIG. 1 is a block diagram of a system that facilitates simplified programming of a quantum computer according to one or more embodiments described herein.

The following detailed description is merely illustrative and is not intended to limit embodiments and/or application or uses of embodiments. Furthermore, there is no intention to be bound by any expressed or implied information presented in the preceding Background or Summary sections, or in the Detailed Description section.

One or more embodiments are now described with reference to the drawings, wherein like referenced numerals are used to refer to like elements throughout. In the following description, for purposes of explanation, numerous specific details are set forth in order to provide a more thorough understanding of the one or more embodiments. It is evident, however, in various cases, that the one or more embodiments can be practiced without these specific details.

Physical limitations associated with classical computing technology have recently presented significant challenges to the continued advancement of computing technology. Thus, in recent years, the computing industry and academic community have turned to quantum computing technologies and ways to bring those technologies into reality.

In spite of the incoming wave of universal quantum computers on the horizon, quantum computing has not experienced a similar growth. Because quantum computing models behave in ways that are significantly different from their classical computing counterparts, conventional intuition and understanding of how computation systems work and how to design algorithms and softwares have been rendered unusable. Thus, in spite of half a century of research efforts on theoretical quantum computing, only a small set of quantum algorithms have been discovered. One such example is the Grover's Search algorithm, which is disclosed in Grover, "A framework for fast quantum mechanical operations." As disclosed by Grover, "a general technique for deriving a class of fast quantum mechanical algorithms" is given in which "[t]he idea is to first consider a single quantum mechanical operation, or a combination of such operations, due to which there is a certain probability for the system to reach a certain target state t." Subsequently, Grover discloses that "the probability of reaching the target state can be made to grow quadratically with the number of iterations by iterating the quantum mechanical operations in the prescribed way."

Further, from a software point of view, the ability to understand a simple piece of quantum program, let alone design and develop sophisticated tool stacks, is predicated upon a sufficient amount of background knowledge on quantum computing systems. In the current state of the art, such background knowledge cannot be assumed for most software engineering researchers and practitioners trained in classical computing technology.

In view of this disparity between the proliferation of quantum computers and quantum computing, it is desirable to bridge the accessibility and practicality gap surrounding quantum computing so that software engineering researchers and practitioners can be better prepared to reap their benefits as universal quantum computers become increasingly more available and powerful. Towards this and/or related goals, an end-to-end quantum computing framework for solving computing problems, such as nondeterministic polynomial (NP)-complete problems, is described herein. Various embodiments described herein relate to NP-complete problems, which can benefit from a greater increase in computing speed and/or performance in comparison to classical computers than that associated with other, less computationally hard problem types. It should be appreciated, however, that the embodiments described herein can be utilized to solve any computing problem of any suitable problem type or classification.

With reference to the drawings, FIG. 1 illustrates a block diagram of a system 100 that facilitates simplified and/or otherwise improved quantum programming according to one or more embodiments described herein. Repetitive description of like elements employed in other embodiments described herein is omitted for sake of brevity. As shown in FIG. 1, the system 100 includes a reduction component that reduces a first computing problem of a problem type, e.g., a first NP-complete problem, to a second computing problem of the problem type, e.g., a second NP-complete problem. In an aspect, the second computing problem constructed by the reduction component 110 can be associated with a quantum circuit.

The system 100 further includes an execution component 120 that can facilitate execution of the quantum circuit associated with the second computing problem at a quantum computer 102. In an aspect, the execution component 120 can facilitate operation of the quantum computer 102 by providing quantum circuit information associated with the second computing problem to the quantum computer 102, as described in accordance with various aspects herein.

Execution of the second computing problem at the quantum computer 102 can result in a first output corresponding to the second computing problem constructed by the reduction component 110. The system 100 further includes a mapping component 130 that can map the first output obtained by the quantum computer 102 via the execution component 120 to a second output that corresponds to the original computing problem provided to the reduction component 110.

It is to be appreciated that the system 100 (e.g., the reduction component 110, the execution component 120, and/or the mapping component 130) performs operations that cannot be performed by a human (e.g., operations that are greater than the capability of a single human mind). For example, an amount of data processed, a speed of data processed and/or data types of data processed by the system 100 (e.g., the reduction component 110, the execution component 120, and/or the mapping component 130) over a certain period of time can be greater, faster and different than an amount, speed and data type that can be processed by a single human mind over the same period of time. The system 100 (e.g., the reduction component 110, the execution component 120, and/or the mapping component 130) can also be fully operational towards performing one or more other functions (e.g., fully powered on, fully executed, etc.) while also performing the operations described herein. Moreover, quantum circuit configurations, quantum code, and/or other outputs of the system 100 (e.g., the reduction component 110, the execution component 120, and/or the mapping component 130) can include information that is impossible to obtain manually by a user in a useful or reasonable amount of time.

Additionally, it is to be appreciated that the system 100 can provide various advantages as compared to conventional quantum programming tools. For instance, the system 100 can reduce the accessibility and practicality constraints noted above with respect to quantum computing by providing an end-to-end quantum computing framework for solving NP-complete problems and/or other problems via reduction. By implementing the quantum computing framework corresponding to the system 100, toolkits and/or other aids can be provided to software engineering researchers and practitioners in order to enable such users to enjoy the speedup and scalability benefits of universal quantum computers even in the absence of prior knowledge on quantum computing. As another example, the consistency and/or accuracy quantum code generated by the system 100 can be improved in relation to similar code generated by conventional tools. Also or alternatively, the time associated with development of quantum code for a given use case can be reduced. Other advantages can also be realized.

Figure 2:
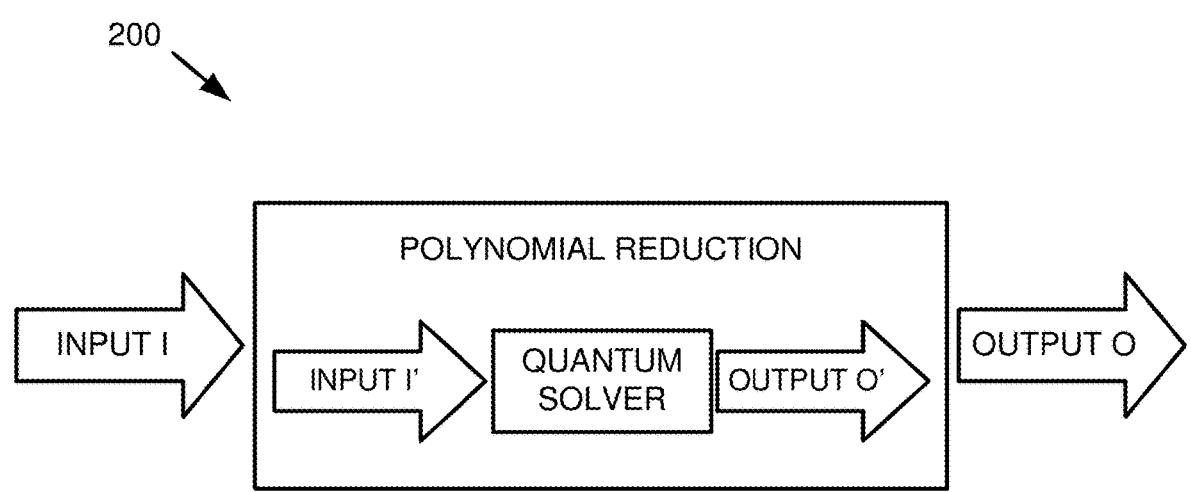
FIG. 2 is a diagram depicting an example, non-limiting quantum computing solution pipeline that can be utilized by one or more embodiments described herein.

Diagram 200 in FIG. 2 depicts an example quantum NP-complete solution framework, e.g., as implemented by system 100. As shown by diagram 200, the framework exploits reduction such that all NP-complete problems can potentially be solved by a core quantum solver that is directed to a single NP-complete problem, since all other NP-complete problems can be solved by using a reduction wrapper around the core solver according to properties of NP-complete problems as known in the art. By designing the framework in this way shown by diagram 200, the difficulty associated with constructing quantum models and/or encodings for a whole array of different NP-complete problems can be circumvented, as a quantum solution for a given NP-complete problem can be utilized to find solutions for respective other NP-complete problems.

In an aspect, the framework shown in diagram 200 can function as an end-to-end framework for bringing the potential power of universal quantum computers in a generalized manner to software engineering researchers and practitioners. Further, the framework uses reduction to circumvent the significant difficulty associated with modeling, encoding, and solving multiple different NP-complete problems on universal quantum computers. Various embodiments described herein can utilize a generalized formulation for the Grover's Search algorithm in connection with a corresponding Boolean satisfiability (SAT) solver to implement a fully automated solution toolkit. It should be appreciated, however, that the various embodiments shown and described herein could be modified, extended, and/or otherwise configured to utilize any other suitable algorithm(s) for any other suitable base computing problem(s) without departing from the scope of the description or the claims provided herein.

Quantum Computing Overview

The following description is intended to serve as a brief high-level overview of quantum computing in order to foster a basic understanding of the concepts utilized herein. The following description is not intended as an exhaustive description of quantum computing but is instead given as background information relating to various aspects of quantum computing that are utilized by one or more embodiments described herein.

Quantum computing is fundamentally different from classical computing in regard to bit structures. For instance, while classical computers use bits that can only hold a value of either 0 or 1, the basic quantum computing unit is a quantum bit, or qubit, which, besides being in the traditional states 0 or 1, denoted herein as $|0\rangle$ and $|1\rangle$ and termed the computational basis states, can also be in a superposition (i.e., linear combination) of both. This superposition can be given as the following:

$$|q\rangle = \alpha|0\rangle + \beta|1\rangle,$$

where the complex coefficients α and β are called the probability amplitudes, in that $|\alpha|^2$ and $|\beta|^2$ represent the probabilities of outcomes $|0\rangle$ and $|1\rangle$ upon measuring the qubit. The above is given in terms of probabilities and measurements because the superposition of a qubit collapses to either of the computational basis states upon measurement. Further, because of the nature of probabilities, α and β follow the constraint $|\alpha|^2+|\beta|^2=1$.

As an example to illustrate the above, a single qubit has two possible outcomes upon measurement, namely $|0\rangle$ and $|1\rangle$. Thus for a single-qubit system, the state vector of the system can be given as $[\alpha,\beta]^T$, which contains the two probability amplitudes corresponding to the two possible outcomes. If a qubit is initialized to be in the $|0\rangle$ (or $|1\rangle$) state, then the state vector of the qubit would be $[1,0]^T$ (or $[0,1]^T$), indicating that the measurement outcome would be a deterministic $|0\rangle$ (or $|1\rangle$) at this point.

In an aspect, qubits can be interpreted geometrically, e.g., each qubit can be thought of as a vector from the origin to a point on the 3-D unit-sphere, referred to as the Bloch sphere, where the north (+Z) and south (-Z) poles correspond to the $|0\rangle$ and $|1\rangle$ states. Further, in a similar manner to the classical AND/OR/NOT gates that can be applied to classical bits to manipulate their values, qubits can similarly be acted upon by quantum gates. Based on the Bloch sphere construction given above, three single-qubit quantum gates, known as the Pauli gates, can rotate the qubit along the three axes. Specifically:

$$Pauli\text{-}X = \begin{bmatrix} 0 & 1 \\ 1 & 0 \end{bmatrix}, Pauli\text{-}Y = \begin{bmatrix} 0 & -i \\ i & 0 \end{bmatrix}, Pauli\text{-}Z = \begin{bmatrix} 1 & 0 \\ 0 & -1 \end{bmatrix}.$$

The Pauli-X gate can transform a state $\alpha|0\rangle+\beta|1\rangle$ to $\beta|0\rangle+\alpha|1\rangle$ (e.g., from $|0\rangle$ to $|1\rangle$, and from $|1\rangle$ to $|0\rangle$), similar to the NOT gate used in classical computers. Pauli-Z, on the other hand, transforms a state from $|1\rangle$ to $-|1\rangle$ (e.g., by flipping the amplitude). Other single-qubit and multiple-qubit quantum gates can also be used, as will be described in further detail below.

Another single-qubit quantum gate is the Hadamard gate, which can be used to place a deterministic qubit into a superpositioned state. In an aspect, the single-qubit Hadamard gate is equivalent to the 2×2 matrix $$H = \frac{1}{\sqrt{2}}\begin{bmatrix} 1 & 1 \\ 1 & -1 \end{bmatrix}.$$

With regard to a $|0\rangle$ qubit, a Hadamard gate has the following effect:

$$\frac{1}{\sqrt{2}}\begin{bmatrix} 1 & 1 \\ 1 & -1 \end{bmatrix} \cdot \begin{bmatrix} 1 \\ 0 \end{bmatrix} = \frac{1}{\sqrt{2}}\begin{bmatrix} 1 \\ 1 \end{bmatrix},$$

which would result in the qubit having a value of either $|0\rangle$ or $|1\rangle$ when measured, both with probability $$\left(\frac{1}{\sqrt{2}}\right)^2 = \frac{1}{2}.$$

Therefore, the output qubit is placed in a superpositioned state, being both $|0\rangle$ and $|1\rangle$ at the same time until the state collapses due to measurement.

In an aspect, the $$\frac{1}{\sqrt{2}}$$

factor in the Hadamard matrix accounts for the fact that quantum gates manipulate quantum state vectors comprised of probability amplitudes, which are constrained in that probabilities for a given set of quantum states will sum to 1. Quantum operations, therefore, are unitary from the point of view of their equivalent matrices, which essentially make quantum gates operators that rotate quantum unit-length state vectors on their respective high-dimensional unit spheres.

In a similar manner to the single-qubit cases described above, for a 2-qubit system $|q_0 q_1\rangle$, there are $2^2=4$ possible measurement outcomes, namely $|00\rangle$, $|01\rangle$, $|10\rangle$, or $|11\rangle$. These outcomes correspond to the state vector $[\alpha, \beta, \gamma, \delta]^T$. In other words, the 2-qubit system is described as follows:

$$|q_0 q_1\rangle = \alpha|00\rangle + \beta|01\rangle + \gamma|10\rangle + \delta|11\rangle.$$

$$|\alpha|^2+|\beta|^2+|\gamma|^2+|\delta|^2=1.$$

If both qubits are initialized as $|0\rangle$ and then passed through Hadamard gates, the result is a uniformly superpositioned state vector $$\left[\frac{1}{2}, \frac{1}{2}, \frac{1}{2}, \frac{1}{2}\right]^T,$$

with the same $$\left(\frac{1}{2}\right)^2 = \frac{1}{4}$$

probability for each of the four outcomes upon measurement.

In an aspect, it is the nature of quantum superposition that grants quantum computing its exponential scalability over classical computing. Most, if not all, quantum algorithms proceed by first putting qubits into a superpositioned state, then carrying out a series of one or more unitary operations over the qubits, before taking the final measurement for the outcome. A representative of such quantum algorithms is the Grover's Search algorithm, which exploits the nature of quantum superposition and achieves searching through an unordered list of N items with only $O(\sqrt{N})$ lookups, as opposed to the classical realm, in which an average of $$\frac{N}{2}$$

(or $\Omega(N)$) lookups would be conducted. The Grover's Search algorithm is described in more detail below.

Besides superposition, another distinguishing property of quantum computing is quantum entanglement, which can be loosely pictured as the correlation among qubits in a multi-qubit system. If the multiple qubits are prepared or operated on in ways that entangle them together, the individual qubits then cannot be described independently from each other, e.g., measuring one will determine the outcome of its entangled counterparts.

A concrete example of quantum entanglement will now be described with respect to the two-qubit system $|q_0 q_1\rangle$ given above in its uniformly superpositioned state after the operations of Hadamard gates from our previous example:

$$|q_0 q_1\rangle = \frac{1}{2}|00\rangle + \frac{1}{2}|01\rangle + \frac{1}{2}|10\rangle + \frac{1}{2}|11\rangle.$$

In the event that $|q_0\rangle$ is measured and exhibits a value of $|0\rangle$, then the whole 2-qubit state becomes as follows:

$$|q_0 q_1\rangle_{|q_0\rangle=|0\rangle} = \frac{1}{2}|00\rangle + \frac{1}{2}|01\rangle + 0|10\rangle + 0|11\rangle,$$

where $|q_1\rangle$ still has an equal probability of being measured as either $|0\rangle$ or $|1\rangle$, just like before $|q_0\rangle$ was measured. On the other hand, had $|q_0\rangle$ been measured to be $|1\rangle$, the 2-qubit state would have instead become as follows:

$$|q_0 q_1\rangle_{|q_0\rangle=|1\rangle} = 0|00\rangle + 0|01\rangle + \frac{1}{\sqrt{2}}|10\rangle + \frac{1}{\sqrt{2}}|11\rangle,$$

where $|q_1\rangle$ would be in the same situation as before, namely equal probability for $|q_1\rangle=|0\rangle$ and $|q_1\rangle=|1\rangle$. Therefore, in this case, the two qubits are not entangled, in that measuring one (and thus causing its superposition to collapse either way) has no bearing on the probability distribution of the other.

Figure 3:
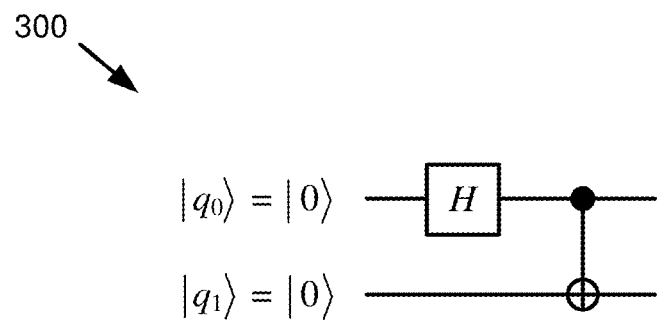
FIG. 3 is a diagram of a quantum circuit that facilitates preparation of fully entangled quantum states according to one or more embodiments described herein.

However, instead of the uniformly superpositioned state given above, the two qubits could be prepared by putting the first one through a Hadamard gate, and then both through what is known as a controlled-not gate, as illustrated by diagram 300 in FIG. 3. The outcome of the quantum circuit shown by diagram 300 would be a fully entangled state, called the Bell State.

As described above, the Hadamard gate H puts $|q_0\rangle$ into a superpositioned state. The controlled-not gate further shown in diagram 300 then operates on the two qubits, for which the first qubit $|q_0\rangle$ is unchanged, but the amplitude of the second one $|q_1\rangle$ will be flipped (hence the "not") if and only if $|q_0\rangle=1$) (hence the "control"). Accordingly, if the two-qubit input state $|q_0 q_1\rangle$ for a controlled-not gate is as follows:

$$|q_0 q_1\rangle_{input} = \alpha|00\rangle + \beta|01\rangle + \gamma|10\rangle + \delta|11\rangle,$$

the output state will be the following:

$$|q_0 q_1\rangle_{output} = \alpha|00\rangle + \beta|01\rangle + \gamma|11\rangle + \delta|10\rangle.$$

In the above, the $\gamma$ and $\delta$ terms for $|q_1\rangle$ flip due to the corresponding $|q_0\rangle=|1\rangle$. Rearranging the last two terms to match the order of the input state, the following is obtained:

$$|q_0 q_1\rangle_{output} = \alpha|00\rangle + \beta|01\rangle + \delta|10\rangle + \gamma|11\rangle.$$

Observing the input and output states, the equivalent unitary matrix for the controlled-not gate can be given as follows:

$$\begin{bmatrix} 1 & 0 & 0 & 0 \\ 0 & 1 & 0 & 0 \\ 0 & 0 & 0 & 1 \\ 0 & 0 & 1 & 0 \end{bmatrix}.$$

In an aspect, the controlled-not gates outputs an always unchanged $|q_0\rangle$ in addition to the $|q_1\rangle$ output due to the unitary property of quantum mechanics. More particularly, quantum operations are governed by the law that probabilities must always sum to 1. As a result of this unitarity, all quantum operations are reversible. As a result, no information, such as the above $|q_0\rangle$ in the controlled-not gate example, is discarded.

With the above understanding of the controlled-not gate, the final output two-qubit state of the circuit shown in diagram 300 can be determined as follows. First, the initial state, given as $$1|00\rangle + 0|01\rangle + 0|10\rangle + 0|11\rangle,$$

subsequent to the operation of the Hadamard gate $|q_0\rangle$, becomes as follows:

$$\frac{1}{\sqrt{2}}|00\rangle + 0|01\rangle + \frac{1}{\sqrt{2}}|10\rangle + 0|11\rangle,$$

or, alternatively in terms of its state vector, $$\frac{1}{\sqrt{2}}[1, 0, 1, 0]^T.$$

Next, by applying the controlled-not gate, the following is obtained:

$$\begin{bmatrix} 1 & 0 & 0 & 0 \\ 0 & 1 & 0 & 0 \\ 0 & 0 & 0 & 1 \\ 0 & 0 & 1 & 0 \end{bmatrix} \cdot \frac{1}{\sqrt{2}} \begin{bmatrix} 1 \\ 0 \\ 1 \\ 0 \end{bmatrix} = \frac{1}{\sqrt{2}} \begin{bmatrix} 1 \\ 0 \\ 0 \\ 1 \end{bmatrix},$$

which indicates an output state of $$\frac{1}{\sqrt{2}}|00\rangle + 0|01\rangle + 0|10\rangle + \frac{1}{\sqrt{2}}|11\rangle.$$

If the zero-probability terms are omitted from the above, the output state can be simplified as follows:

$$\frac{|00\rangle + |11\rangle}{\sqrt{2}}.$$

The above is a fully entangled state in the sense that, even though each of the two qubits has a 50-50 chance of being measured as either $|1\rangle$ or $|0\rangle$, as soon as one of them is measured, the other collapses to the same outcome no matter how far apart the two entangled qubits might be at the time of the first measurement. It should be appreciated that this is different from the example of two qubits in a uniformly superpositioned state, where measuring one reveals nothing about the other.

Figure 4:
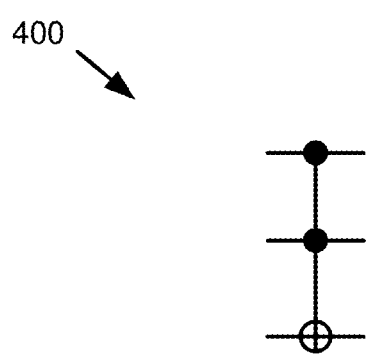
FIG. 4 is a diagram depicting an example, non-limiting controlled-controlled-not (CCX) gate that can be utilized by one or more embodiments described herein.

As illustrated by the example above, multi-qubit quantum gates tend to have the effect of tangling qubits together. Besides the 2-qubit controlled-not gate, other multi-qubit gates can also be used. For example, the controlled-controlled-not (CCX) gate, also known as the Toffoli gate, is a 3-qubit gate, as shown by diagram 400 in FIG. 4. The CCX gate keeps the top two qubits unchanged, and flips the state of the last qubit if both of the top two qubits are $|1\rangle$. Therefore, its corresponding unitary matrix is as follows:

$$\begin{bmatrix} I_{6\times 6} & 0 & 0 \\ 0 & 0 & 1 \\ 0 & 1 & 0 \end{bmatrix},$$

where $I_x$ is an identity matrix of the specified size. It can further be appreciated that the CCX gate is universal, in the same sense that the NAND gate is universal for classical computing.

In an aspect, respective quantum algorithms are designed to take advantage of the nature of superposition and entanglement of quantum systems to achieve their desired effects. By putting qubits into superpositioned states, simultaneous manipulations on multiple different inputs can be performed while carrying out the intended operation only once. Therefore, for an operation that needs to be carried out over all possible information that n bits can carry, a classical computer would utilize $2^n$ operations, one for each particular configuration of the n bits, whereas a quantum computer uses just a single operation, carried out on the superposition of all $2^n$ possible configurations, yielding an exponential speedup. However, due to the probabilistic nature of quantum systems, the outcome of a quantum algorithm can in some cases be indeterministic, in which case multiple repeated runs and measurements can be used to determine the most probable outcomes.

NP-Complete Quantum Solver

Based on the mechanics of quantum computing as generally set forth above, various embodiments described herein can implement a general approach to utilize quantum computers for solving computing problems, such as NP-complete problems.

In an aspect, a quantum solver as described herein can leverage various properties of computational complexity, e.g., that NP-complete problems can be reduced to each other in polynomial time, to program a quantum computer to solve a base NP-complete problem, thereby enabling programming of quantum computers to solve NP-complete problems by first reducing them to the base NP-complete problem.

Figure 5:
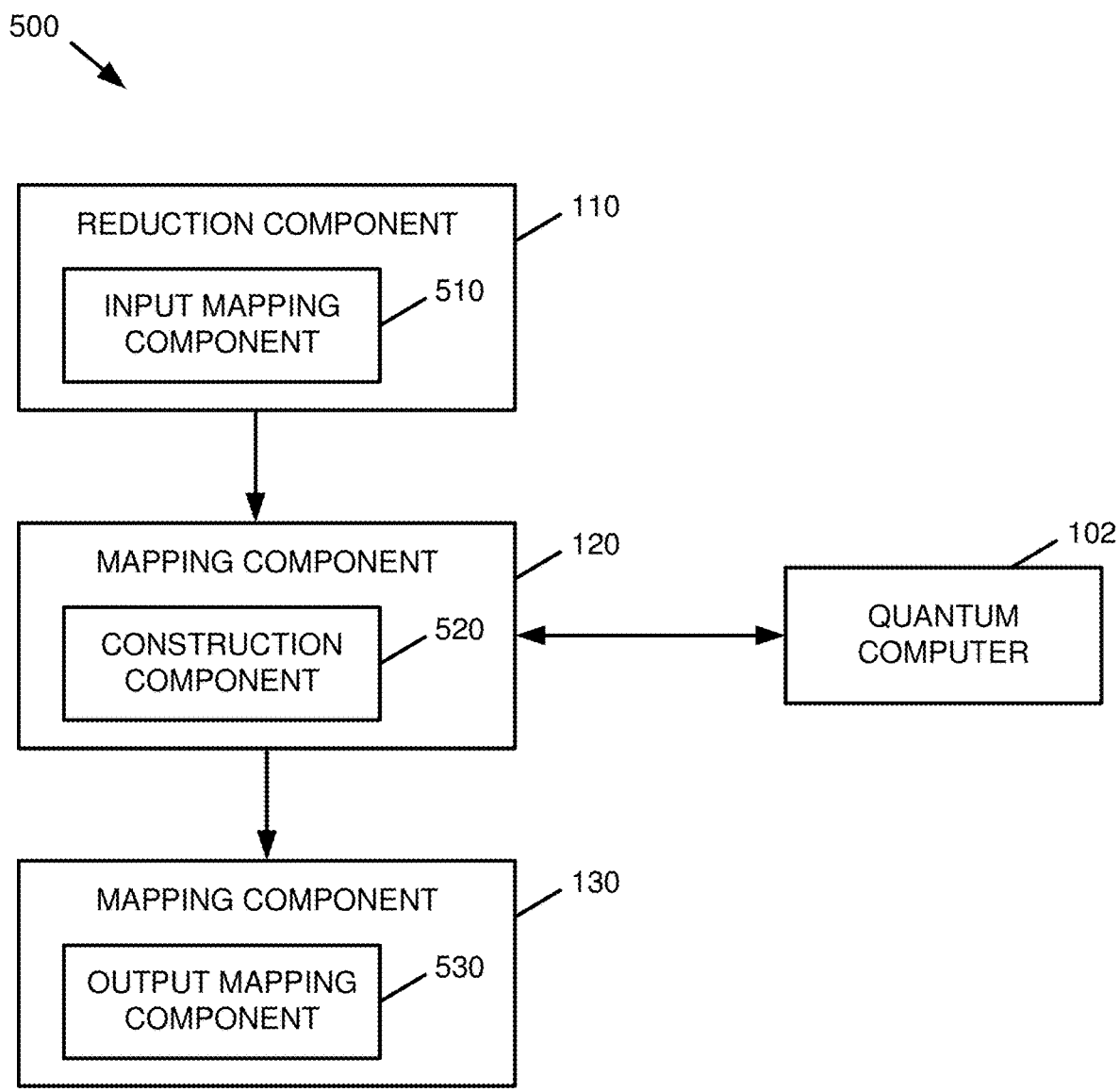
FIG. 5 is a block diagram of a system that facilitates simplified programming of a quantum computer via input mapping and output mapping according to one or more embodiments described herein.

Turning to FIG. 5, a block diagram of a system 500 that facilitates simplified programming of a quantum computer via input mapping and output mapping according to one or more embodiments described herein is illustrated. Repetitive description of like elements employed in other embodiments described herein is omitted for sake of brevity. The system 500 includes a reduction component 110, an execution component 120, and a mapping component 130 that can function as described above with respect to FIG. 1. As further shown by system 500, the reduction component 110, execution component 120, and mapping component 130 can each be extended via an input mapping component 510, a construction component 520, and an output mapping component 530, respectively, to implement a quantum algorithm that directly solves a particular computing problem (e.g., an NP-complete problem) S. For instance, given an input set I for a generalized computing problem, the input mapping component can transform the input via a polynomial-time reduction, e.g., according to a given reduction mapping, into a second input set I' corresponding to problem S, upon which the core quantum solver can directly operate. Next, the construction component 520 can generate configuration data for construction of a quantum circuit corresponding to problem S at the quantum computer 102. Upon receiving an output O' from the quantum algorithm configured by the construction component 520, the output mapping component 530 can convert the received output to the desired output O for the original input NP-complete problem, e.g., based on the reduction mapping utilized by the input mapping component 510.

In an aspect, the system 500 can be configured to select both a computing problem for operation by the core quantum solver and an algorithm for solving the selected problem. While various examples provided herein relate to specific problem classifications and/or algorithms, it should be appreciated that any suitable problem classification(s) and/or algorithm(s) could be utilized. Unless explicitly stated otherwise, references to particular problem types and/or algorithms herein are given solely for illustrative purposes and are not intended to limit the scope of the claimed subject matter.

Quantum 3-SAT Grover Solver

Figure 6:
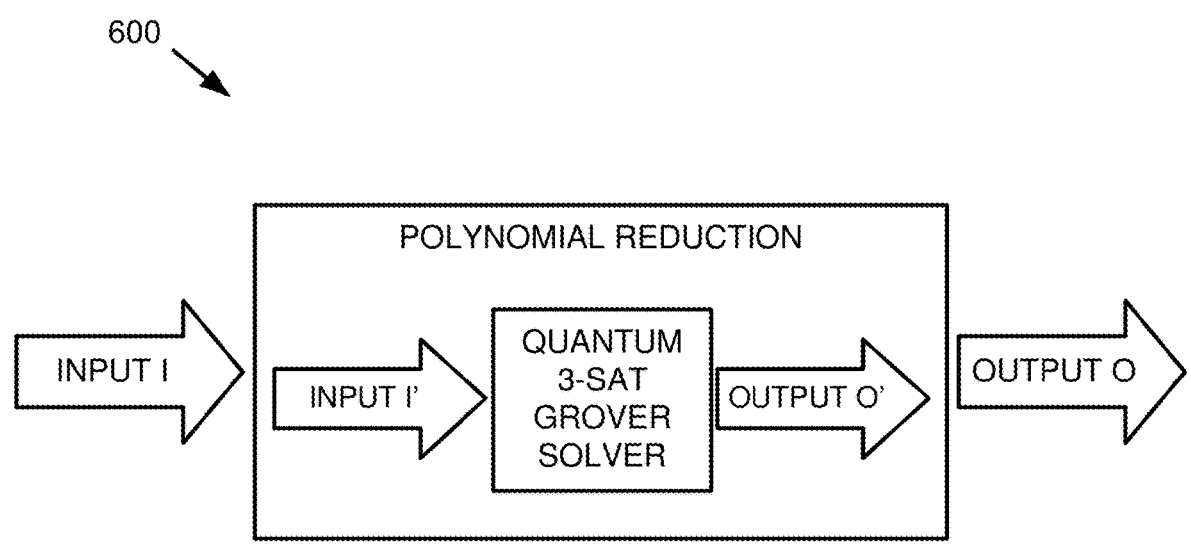
FIG. 6 is a diagram depicting an example, non-limiting quantum computing solution pipeline that can be utilized by one or more embodiments described herein.

Turning to FIG. 6, diagram 600 illustrates a specific, non-limiting example of a quantum NP-complete solution framework, e.g., the framework shown by diagram 200, instantiated for solving Boolean 3-Satisfiability (3-SAT) problems via the Grover's Search algorithm. It should be appreciated that other problem types and/or algorithms could also be used in addition to, or in place of, the ones shown by diagram 600. In an aspect, diagram 600 illustrates that a general NP-complete input problem is first transformed via reduction to 3-SAT and then solved using Grover's Search, whose output can then be transformed back according to the same reduction.

In an aspect, the Grover's Search algorithm accepts an unordered collection of N items and a binary oracle function $f(\cdot)$ that indicates whether an item meets the search criterion. Accordingly, if a random item i is selected from the collection, $f(i)==1$ would indicate a hit while $f(i)==0$ would indicate that further searching is needed. In classical computing, an average of $$\frac{N}{2}$$

(or $\Omega(N)$) queries to the oracle function would be performed since a single $f$ lookup can only check on a single item. On a quantum computer, however, a single $f$ query can have the effect of checking on multiple items all at once because qubits can be put in superpositioned states. For example, if $n=\log_2 N$ qubits are placed into a uniform superposition, then a single application of $f$ can be used to check all N items at once.

In another aspect, Grover's algorithm can be utilized as follows. Initially, a set of n qubits are utilized to encode $N=2^n$ possible states (items), of which $|\psi\rangle$ is the search target. In other words:

$$f(x) = \begin{cases} 1, & \text{if } x \neq \psi \\ 0, & \text{if } x = \psi \end{cases}.$$

First, the n qubits are put in uniform superposition utilizing Hadamard gates as described above. Next, a marking step is carried out, in which the amplitude of the target state is flipped while leaving the amplitudes of the other states unchanged. This can done by constructing a unitary operator $U_f$, such that:

$$U_f|x,y\rangle = |(x,f(x)\oplus y)\rangle,$$

where $\oplus$ represents binary XOR, x represents the state of the n qubits used to encode the N items and is initialized to be in the uniform superposition of all N items, and y is an ancillary (helper) qubit, prepared by feeding $|1\rangle$ through a Hadamard gate, as follows:

$$|y\rangle = H|1\rangle = \frac{|0\rangle - |1\rangle}{\sqrt{2}}.$$

After the marking step, the system state $|x, y\rangle$ becomes as follows:

$$U_f\left(|x\rangle \frac{|0\rangle - |1\rangle}{\sqrt{2}}\right) = |x\rangle \frac{|f(x)\oplus 0\rangle - |f(x)\oplus 1\rangle}{\sqrt{2}}$$

$$= |x\rangle \frac{|f(x)\rangle - |\overline{f(x)}\rangle}{\sqrt{2}}$$

$$= (-1)^{f(x)}|x\rangle \frac{|0\rangle - |1\rangle}{\sqrt{2}}$$

$$= (-1)^{f(x)}|x, y\rangle$$

$$= \begin{cases} +|x, y\rangle, & \text{if } x \neq \psi \\ -|x, y\rangle, & \text{if } x = \psi \end{cases}.$$

As shown by the above, the amplitude for the target state $\psi$ is flipped, and the amplitudes of all other states remain unchanged, thereby marking the target state.

However, merely marking the target state with a flipped amplitude does not by itself sufficiently differentiate the target state, since if the system is measured after marking, the negative sign in front of the amplitude of the target state would be squared away when computing its outcome probability, rendering the target state still equally likely as any other state. Accordingly, Grover's algorithm causes the target state to stand out via an additional amplitude amplification step, which can be accomplished via inversion about the mean.

As an example of the inversion and amplification effect, consider a set of five equal numbers in which a target number has a negative sign, e.g., 1, 1, 1, 1, −1. If the inverses (or mirror reflections) of all five numbers are taken about their mean ⅗, they become ⅕, ⅕, ⅕, ⅕, ¹¹⁄₅, where ⅕=⅗×2−1, and ¹¹⁄₅=⅗×2−(−1). As can be seen, because the mean is closer to the majority, inversion about the mean grows the magnitude of the target by a relatively large margin, while at the same time shrinks the magnitude of the other numbers (e.g., the majority) by a smaller margin.

Returning to Grover's algorithm as implemented herein, a unitary operation $M_n$, which can be given as follows:

$$M_n = I_{2^n \times 2^n} - 2A_{2^n \times 2^n},$$

where $A_{2^n \times 2^n}$ is a $2^n \times 2^n$ matrix filled with $$\frac{1}{2^n},$$

or more concisely $$A_{2^n \times 2^n} = \frac{1}{2^n} 1_{2^n \times 2^n},$$

where $1_{2^n \times 2^n}$ denotes the $2^n \times 2^n$ matrix filled with 1. Therefore, $$M_n = \begin{bmatrix} 1 - \frac{2}{2^n} & -\frac{2}{2^n} & \cdots & -\frac{2}{2^n} \\ -\frac{2}{2^n} & 1 - \frac{2}{2^n} & \cdots & -\frac{2}{2^n} \\ \vdots & \vdots & \ddots & \vdots \\ -\frac{2}{2^n} & -\frac{2}{2^n} & \cdots & 1 - \frac{2}{2^n} \end{bmatrix}.$$

To verify the rotation-about-the-mean effect, $M_n$ can be applied to an already marked (last item) state vector $$v = \frac{[1, 1, \ldots, -1]^T}{2^{\frac{n}{2}}},$$

thereby obtaining the following:

$$M_n \cdot v = \frac{\left[\frac{4}{2^n} - 1, \frac{4}{2^n} - 1, \ldots, \frac{4}{2^n} - 3\right]^T}{2^{\frac{n}{2}}}.$$

Quantitatively, the amount by which the amplitude of each non-target state decreases is $$\frac{1}{2^{\frac{3n}{2}-2}},$$

whereas the amplitude of the target state increases by $$\frac{2^{n-1} - 1}{2^{\frac{3n}{2}-2}}.$$

Based on the amplification transformation $M_n$, an N-dimensional ($N=2^n$) state vector $v_{(N,i)}$ with target index i, after a single iteration of amplification $M_n \cdot v_{(N,i)}$, can have an amplitude ratio between its non-target and target (i.e., the i-th) elements given as $$\frac{-N + 4}{-3N + 4}.$$

Further, it can be appreciated that the amplitudes of the non-target elements vanish when N=4, and as N grows, the amplitude of the i-th element asymptotically approaches triple that of the amplitudes of the non-target elements. It can be further appreciated that flipping the sign of $M_n$ does not affect the amplification effect, e.g., the matrix $-M_n$ could also be used.

In an aspect, Grover's Search algorithm can operate by repeating application of the above marking and amplification steps, with each round progressively amplifying the amplitude of the target state. It should be appreciated that all items are "examined" in a single round due to superposition, while the oracle function $f$ is invoked only once per round. In general, $O(\sqrt{N})$ (or $$O(2^{\frac{n}{2}}))$$

are sufficient to identify the target state with a substantial degree of certainty. Compared to classical algorithms, this algorithm yields a quadratic increase in speed.

With reference to the 3-SAT problem as implemented herein, a 3-SAT problem is a Boolean feasibility test for expressions given in conjunctive normal form, e.g., ANDs of ORs, with each disjunctive clause containing no more than three variables. In an aspect, system 500 can utilize Grover's Search algorithm to search for a satisfactory variable assignment. As noted above, Grover's Search algorithm includes a marking step and an amplification step. Accordingly, the construction component 520 as shown in system 500 can generate configuration data for a Grover's Search quantum circuit that includes an oracle marking subcircuit and an input mapping component amplitude amplification subcircuit, each of which are described in further detail below.

Oracle Marking Implementation

As noted above, the marking operation $U_f |x, y\rangle = |x, f(x) \oplus y\rangle$ in Grover's algorithm is determined by the boolean oracle function $f$, which takes as input a single quantum state and outputs whether or not the state is a search target. In an aspect, the oracle function $f$ for a SAT problem can be set to a Boolean CNF expression itself, where the $2^n$ possible states respectively correspond to a particular assignments to the n boolean variables.

Based on this direct mapping between the 3-SAT problem itself and the oracle function, the Boolean operations associated with respective CNFs, e.g., NOT ($\neg$), OR ($\vee$), and AND ($\wedge$) can be defined for implementation on a quantum computer as follows.

A NOT operator can be configured to switch between the $|0\rangle$ and $|1\rangle$ states, or more generally, the $\alpha|0\rangle+\beta|1\rangle$ and $\beta|0\rangle+\alpha|1\rangle$ states to account for quantum superposition. As this is the operation of the quantum Pauli-X gate as described above, a NOT operator can simply be represented as a Pauli-X gate.

For the OR operator, since De Morgan's law provides that $v_1 \vee v_2 \Leftrightarrow \neg(\neg v_1 \wedge \neg v_2)$, OR operations can be converted into AND operations with the help of the NOT operator, which can be implemented via a Pauli-X gate as noted above.

In an aspect, the logical AND operator can be implemented by leveraging CCX gates as described above. As noted above with respect to FIG. 4, the 3-qubit CCX (Toffoli) gate flips the state of the last qubit $|0\rangle \leftrightarrow |1\rangle$ ) if and only if the first two input qubits are both $|1\rangle$. Accordingly, by configuring the first two qubits $|q_0\rangle$ and $|q_1\rangle$ to hold the problem variables and introducing an ancillary (helper) qubit $|q_2\rangle = |0\rangle$ as the last qubit, the corresponding CCX operation results in $|q_2\rangle$ being in the state representing the AND of $|q_0\rangle$ and $|q_1\rangle$. In an aspect, the CCX gate can be extended to achieve a CNX gate (e.g., CC . . . CX for N instances of C, or $C^N X$), thereby enabling logical AND operations for more than two variables. which would then be able to handle the ANDing of an arbitrary number of variables.

Figure 7:
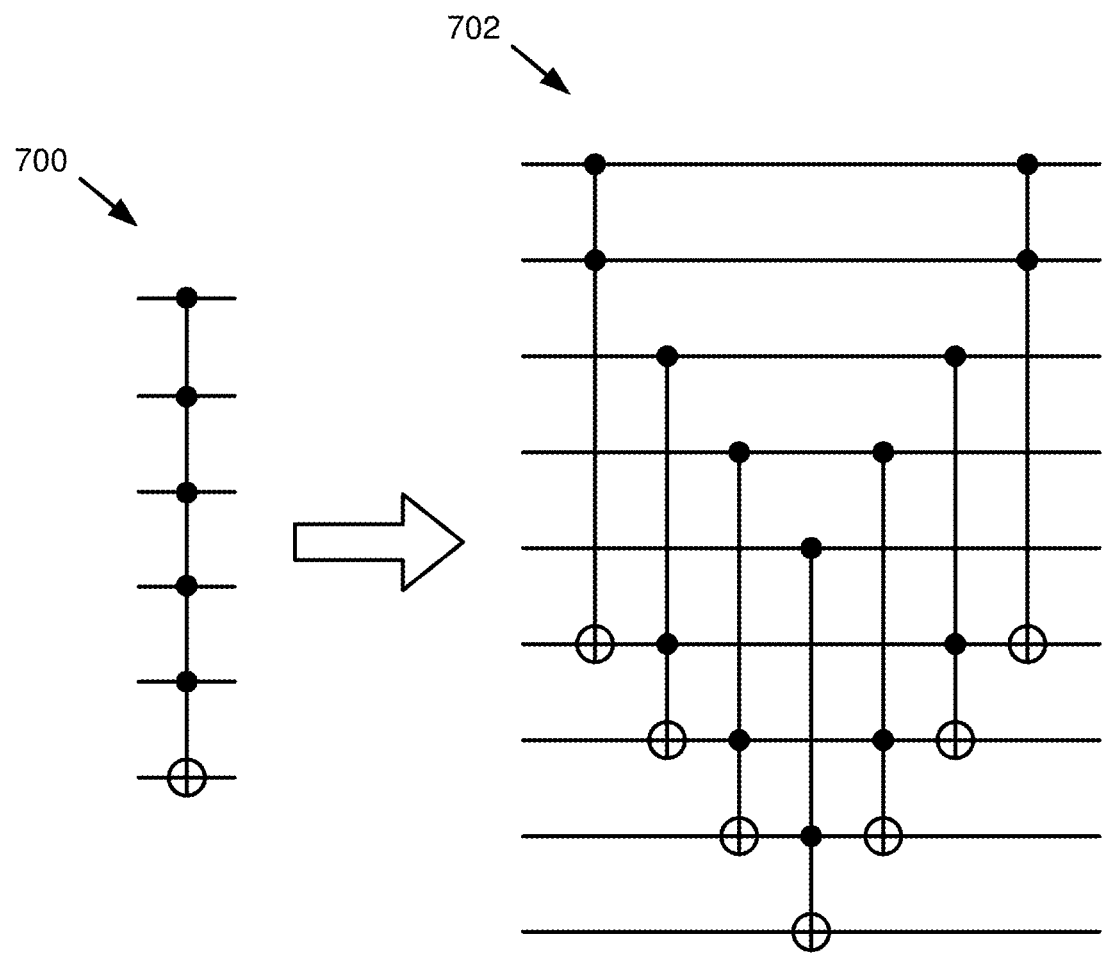
FIG. 7 is a diagram depicting a quantum circuit that facilitates N-th order controlled-not (CNX) operations in accordance with one or more embodiments described herein.

In an example illustrated by FIG. 7, multiple CCX gates illustrated by diagram 700 can be combined to create a CNX gate as illustrated by diagram 700 by combining the multiple CCX gates and introducing respectively corresponding ancillary qubits, where each single CCX brings a new variable into the collective AND, and the ancillas help hold intermediate states.

Figure 8:
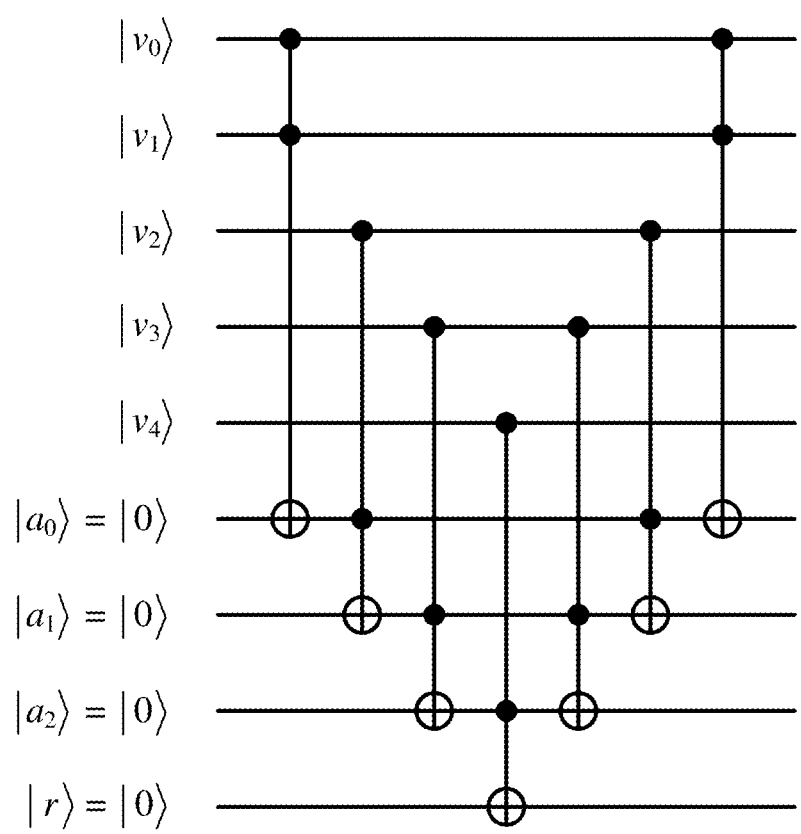
FIG. 8 is a diagram depicting an example, non-limiting CNX operation that can be performed by one or more embodiments described herein.

An example of a logical AND operation for 5 qubits performed via a CNX gate is shown by diagram 800 in FIG. 8. As shown, the $|v_i\rangle$ qubits are the qubits representing the 5 variables to which the AND is to be performed, the $|\alpha_i\rangle$ qubits are the ancillary qubits introduced to hold intermediate state values, and the qubit $|r\rangle$ holds the final AND result. As further shown, a total of 7 CCX gates are used, arranged in a V-shape.

Focusing on the left arm of the V in diagram 800, the first CCX places the intermediate value $|v_0\rangle \wedge |v_1\rangle$ in $|\alpha_0\rangle$. The next CCX brings in $|v_2\rangle$, thereby placing the intermediate value $|v_0\rangle \wedge |v_1\rangle \wedge |v_2\rangle$ in $|\alpha_1\rangle$. These operations continue in a similar manner until the bottom CCX carries out its operation, at which point $|r\rangle$ is placed in the state corresponding to the desired collective AND of the 5 variable qubits.

In an aspect, due to quantum entanglement, the CCX gates on the right side of the V are utilized even after obtaining the desired state of $|r\rangle$ In other words, even though $|r\rangle$ is in our desired state at the valley of the V, the helper $|\alpha_i\rangle$s are entangled with the variable qubits $|v_i\rangle$ and the result qubit $|r\rangle$. As a result, intermediate values they hold cannot be abandoned, because doing so would cause the states of the ancillary qubits to collapse, in turn affecting the states of the variable qubits $|v_i\rangle$ and the result qubit $|r\rangle$. Therefore, the CCX gates on the right side of the V are utilized to clean up the ancillas, thereby reversing them back to their initial $|0\rangle$ state and disentangling them from the other qubits.

In an aspect, similar to the unitary matrix corresponding to the CCX gate as given above, the equivalent matrix of an n-qubit $CNX_n$ gate is a $2^n \times 2^n$ identity matrix with the 2×2 block at the bottom right corner rotated in-plane by $$\frac{\pi}{2},$$

as follows:

$$CNX_n = \begin{bmatrix} I_{(2^n-2)\times(2^n-2)} & 0 & 0 \\ 0 & 0 & 1 \\ 0 & 1 & 0 \end{bmatrix}.$$

Amplitude Amplification Implementation

With regard to the amplitude amplification subcircuit, the amplitude amplification operation is equivalent to the matrix $M_n = I_{2^n \times 2^n} - 2A_{2^n \times 2^n}$, as noted above. In an aspect, this unitary operation can be implemented on a quantum computer as follows. In the following description, the symbols for the single-qubit Hadamard H and Pauli-X and Z gates are paired with subscripts $\bullet_n$ to indicate their n-qubit analogues, which are further defined as follows.

$H_n$ can be used to denote the n-qubit Hadamard transformation, which can be expressed as an n-fold Kronecker product of the single-qubit Hadamard transformation. So, in terms of matrices, $H_n = \otimes_{i=1}^n H$, which is of size $2^n \times 2^n$. Also, $H_n$ has the recurrence property of $$H_{k+1} = \frac{1}{\sqrt{2}} \begin{bmatrix} H_k & H_k \\ H_k & -H_k \end{bmatrix}.$$

Similar to $H_n$, $X_n$ can be used to denote the n-fold Kronecker product of the single-qubit Pauli-X transformation, e.g., $X_n = \otimes_{i=1}^n X$. As a result, for any number n of qubits, $X_n$ can be given as a $2^n \times 2^n$ identity matrix rotated in-plane by $$\frac{\pi}{2}$$

(e.g., such that the matrix is populated with 1 in the anti-diagonal and 0 everywhere else).

Further, $Z_n$ can be given as a $2^n \times 2^n$ identity matrix where the bottom right element is flipped from 1 to −1, e.g., $$Z_n = \begin{bmatrix} I_{(2^n-2) \times (2^n-2)} & 0 & 0 \\ 0 & 1 & 0 \\ 0 & 0 & -1 \end{bmatrix}.$$

Unlike $H_n$ and $X_n$ given above, $Z_n$ cannot be obtained by taking the n-fold Kronecker product of the single-qubit Pauli-Z transformation. However, in comparison to the $CNX_n$ gate described above with respect to FIGS. 7-8, $Z_n$ only differs from it in the bottom right 2×2 block, which for $CNX_n$ is an X, and for $Z_n$ is a Z. In view of the relation $$HXH = \frac{1}{\sqrt{2}} \begin{bmatrix} 1 & 1 \\ 1 & -1 \end{bmatrix} \begin{bmatrix} 0 & 1 \\ 1 & 0 \end{bmatrix} \frac{1}{\sqrt{2}} \begin{bmatrix} 1 & 1 \\ 1 & -1 \end{bmatrix} = \begin{bmatrix} 1 & 0 \\ 0 & -1 \end{bmatrix} = Z$$

that links together X and Z through H, an n-qubit $Z_n$ can be constructed by sandwiching an n-qubit $CNX_n$ transformation between two single-qubit Hadamard transformations on the last qubit. More particularly, $Z_n$ can be given as $Z_n = [(\otimes_{i=1}^{n-1} I) \otimes H] CNX_n [(\otimes_{i=1}^{n-1} I) \otimes H]$, where I is the 2×2 identity matrix.

Based on the above setup, the amplitude amplification transformation $M_n = I_{2^n \times 2^n} - 2A_{2^n \times 2^n}$ as used in the Grover's Search algorithm utilized by one or more embodiments herein can be constructed as $H_n X_n Z_n X_n H_n = M_n$ using one or more mathematical techniques as known in the art.

Using the oracle marking and amplitude amplification subcircuits as described above, various embodiments herein can implement a complete Grover 3-SAT solver for universal quantum computers, which when paired with classical NP reduction can provide a generalized NP-complete quantum solution.

Figure 9:
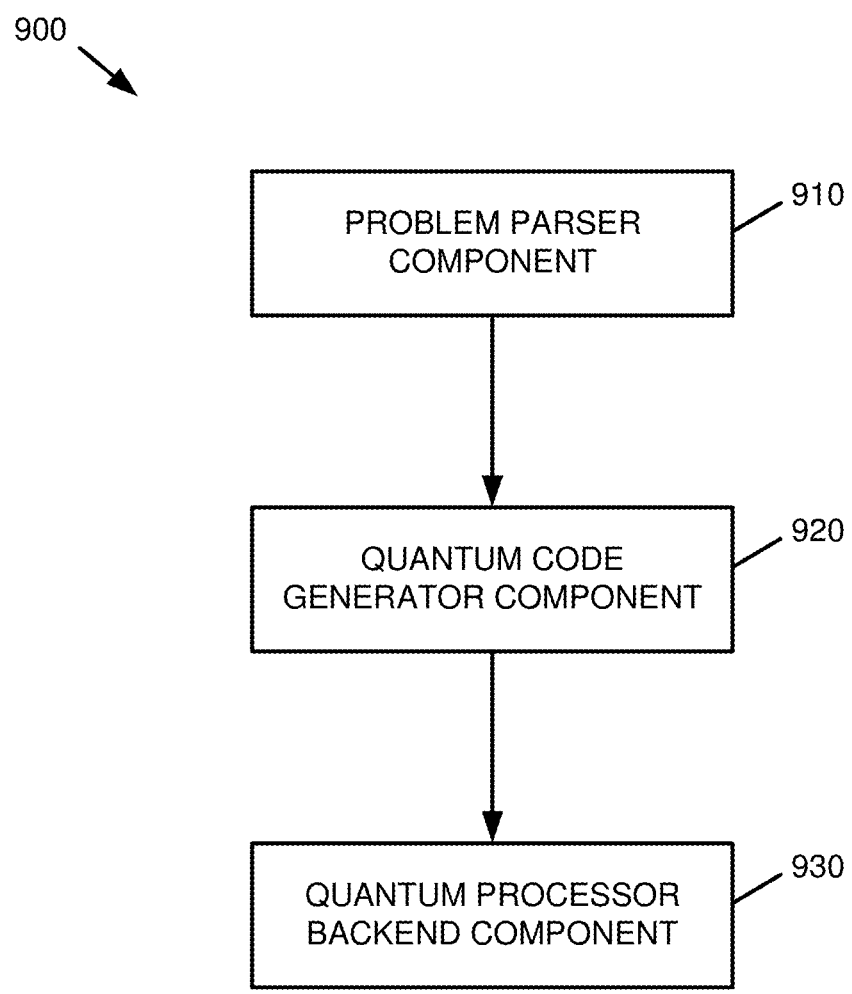
FIG. 9 is a block diagram of a system that facilitates implementation of generalized computing problems on a quantum computer according to one or more embodiments described herein.

With reference next to FIG. 9, a block diagram of a system 900 that facilitates implementation of generalized computing problems on a quantum computer according to one or more embodiments described herein is illustrated. Repetitive description of like elements employed in other embodiments described herein is omitted for sake of brevity. In an aspect, system 900 can collectively function as an end-to-end quantum solution toolkit in accordance with various embodiments as described herein.

As shown in FIG. 9, the system 900 includes a problem parser component 910 that reduces a generalized computing problem to a base computing problem. For instance, the problem parser component 910 can utilize reduction to translate a non-3-SAT NP-complete problem to a 3-SAT instance. Other implementations are also possible.

The system 900 further includes a quantum code generator component 920 that takes as input a problem formation as defined by the problem parser component 910 and automatically generates the corresponding quantum program that solves the parsed problem. For instance, the quantum code generator component 920 can take as input a 3-SAT problem formation and generate a quantum program that solves the 3-SAT problem as described above. Other implementations could also be used. In an aspect, a quantum program generated by the quantum code generator component 920 can be generated in any suitable quantum programming language, such as the Open Quantum Assembly Language (OpenQASM) format and/or other suitable formats.

The system 900 additionally includes a quantum processor backend component 930 that leverages one or more quantum computing devices to execute the quantum code generated by the quantum code generator component 920. The quantum processor backend component 930 can be associated with a common device as the other components in system 900 or a different device, e.g., the quantum processor backend component 930 can facilitate communication between system 900 and one or more quantum computers to facilitate execution of quantum code.

A toolkit as constructed in the manner shown by FIG. 9 can additionally include one or more interfaces to facilitate interaction between a human user and the components of system 900. For instance, a graphical Web interface can be provided for accessing the toolkit in an interactive manner. The interface and/or related components can also or alternatively provide tutorials and/or explanations regarding quantum algorithms, computing problems, quantum computing in general, and/or other topics. As another example, the interface and/or related components can provide for visualization of arbitrarily complex quantum circuits.

In another aspect, an application programming interface (API) and/or other means can be utilized to alter and/or extend the functionality of system 900 in various ways. For instance, the problem parser component 910 can be modified via the API to expand and/or otherwise alter the scope of computing problem types that can be reduced to the base problem type utilized by the quantum code generator component 910. Also or alternatively, the quantum code generator component 920 can be modified via the API to expand and/or otherwise alter the base problem types and/or algorithms that can subsequently be passed onto the quantum processor backend component 930 for execution. In the event that the quantum code generator component 920 can operate according to multiple base problem types and/or quantum algorithms, the quantum code generator component 920 can select a base problem and/or algorithm to use for a given input problem based on a mapping between respective input problems and reduction mappings and/or based on other criteria.

Figure 10:
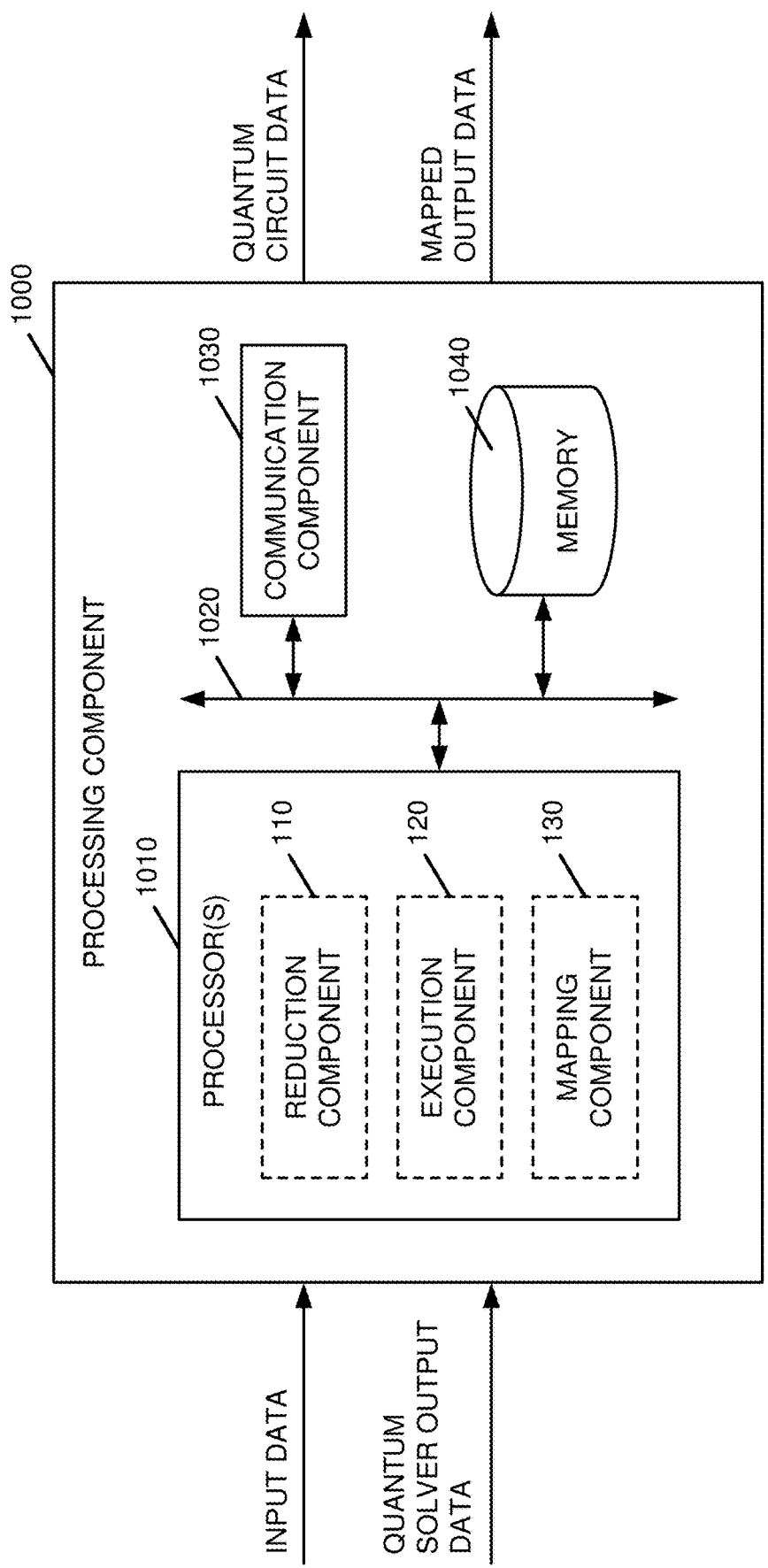
FIG. 10 is a diagram of an example, non-limiting processing component according to one or more embodiments described herein.

Referring next to FIG. 10, a processing component 1000 that can be utilized to implement one or more aspects described herein is illustrated in accordance with one or more embodiments. Repetitive description of like elements employed in other embodiments described herein is omitted for sake of brevity.

As shown in FIG. 10, the processing component 1000 can be associated with at least one processor 1010 (e.g., a central processing unit, a graphical processing unit, etc.), which can be utilized to implement one or more of the reduction component 110, the execution component 120, or the mapping component 130 as described above. The processor(s) 1010 can be connected via a data bus 1020 to one or more additional sub-components of the processing component 1000, such as a communication component 1030 and/or a memory 1040. While the communication component 1030 is illustrated as implemented separately from the processor(s) 1010, the processor(s) 1010 in some embodiments can additionally be used to implement the communication component 1030. In still other embodiments, the communication component 1030 can be external to the processing component 1000 and communicate with the processing component 1000 via a separate communication link.

The memory 1040 can be utilized by the processing component 1000 to store data utilized by the processing component 1000 in accordance with one or more embodiments described herein. Additionally or alternatively, the memory 1040 can have stored thereon machine-readable instructions that, when executed by the processing component 1000, cause the processing component (and/or one or more processors 1010 thereof) to implement the reduction component 110, the execution component 120, or the mapping component 130 as described above.

In various embodiments, the processing component 1000 can be or include hardware, software (e.g., a set of threads, a set of processes, software in execution, etc.) or a combination of hardware and software that performs a computing task (e.g., a computing task associated with received data). For example, the processing component 1000 can execute data analysis and/or other operations that cannot be performed by a human (e.g., are greater than the capability of a human mind). For example, the amount of data processed, the speed of processing of the data and/or the data types processed by the processing component 1000 over a certain period of time can be respectively greater, faster and different than the amount, speed and data type that can be processed by a single human mind over the same period of time. For example, data processed by the processing component 1000 can be raw data (e.g., raw textual data, raw numerical data, etc.) and/or compressed data (e.g., compressed textual data, compressed numerical data, etc.) associated with one or more computing devices. Moreover, the processing component 1000 can be fully operational towards performing one or more other functions (e.g., fully powered on, fully executed, etc.) while also processing the above-referenced data.

Figure 11:
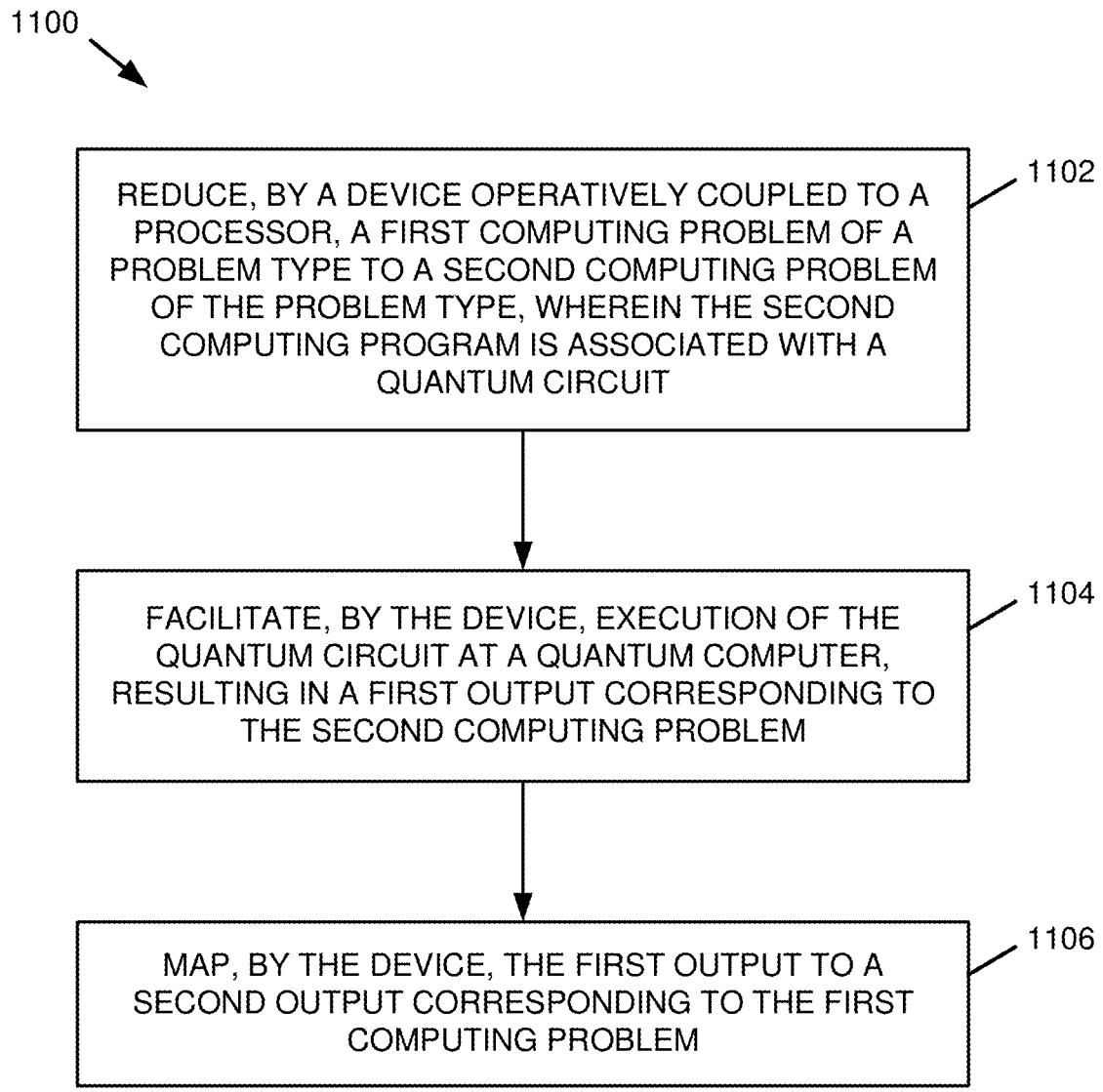
FIG. 11 is a flow diagram of an example, non-limiting computer-implemented method that facilitates simplified quantum programming according to one or more embodiments described herein.

FIG. 11 illustrates a flow diagram of an example, non-limiting computer-implemented method 1100 that facilitates simplified quantum programming according to one or more embodiments described herein. Repetitive description of like elements employed in other embodiments described herein is omitted for sake of brevity.

At 1102, a device operatively coupled to a processor can reduce (e.g., by a reduction component 110) a first computing problem of a problem type to a second computing problem of the problem type. In an aspect, the second computing problem is associated with a quantum circuit.

At 1104, the device can facilitate (e.g., by the execution component 120) execution of the quantum circuit associated with the second computing problem at a quantum computer. In an aspect, execution of the quantum circuit at the quantum computer results in a first output corresponding to the second computing problem.

At 1106, the device can map (e.g., by a mapping component 130) the first output obtained at 1104 to a second output corresponding to the first computing problem obtained at 1102.

For simplicity of explanation, the computer-implemented methodologies are depicted and described as a series of acts. It is to be understood and appreciated that the subject innovation is not limited by the acts illustrated and/or by the order of acts, for example acts can occur in various orders and/or concurrently, and with other acts not presented and described herein. Furthermore, not all illustrated acts can be required to implement the computer-implemented methodologies in accordance with the disclosed subject matter. In addition, those skilled in the art will understand and appreciate that the computer-implemented methodologies can alternatively be represented as a series of interrelated states via a state diagram or events. Additionally, it should be further appreciated that the computer-implemented methodologies disclosed hereinafter and throughout this specification are capable of being stored on an article of manufacture to facilitate transporting and transferring such computer-implemented methodologies to computers. The term article of manufacture, as used herein, is intended to encompass a computer program accessible from any computer-readable device or storage media.

Moreover, because configuration of data packet(s) and/or communication between processing components is established from a combination of electrical and mechanical components and circuitry, a human is unable to replicate or perform the subject data packet configuration and/or the subject communication between processing components and/or an assignment component. For example, a human is unable to generate data for transmission over a wired network and/or a wireless network between processing components, etc.

Figure 12:
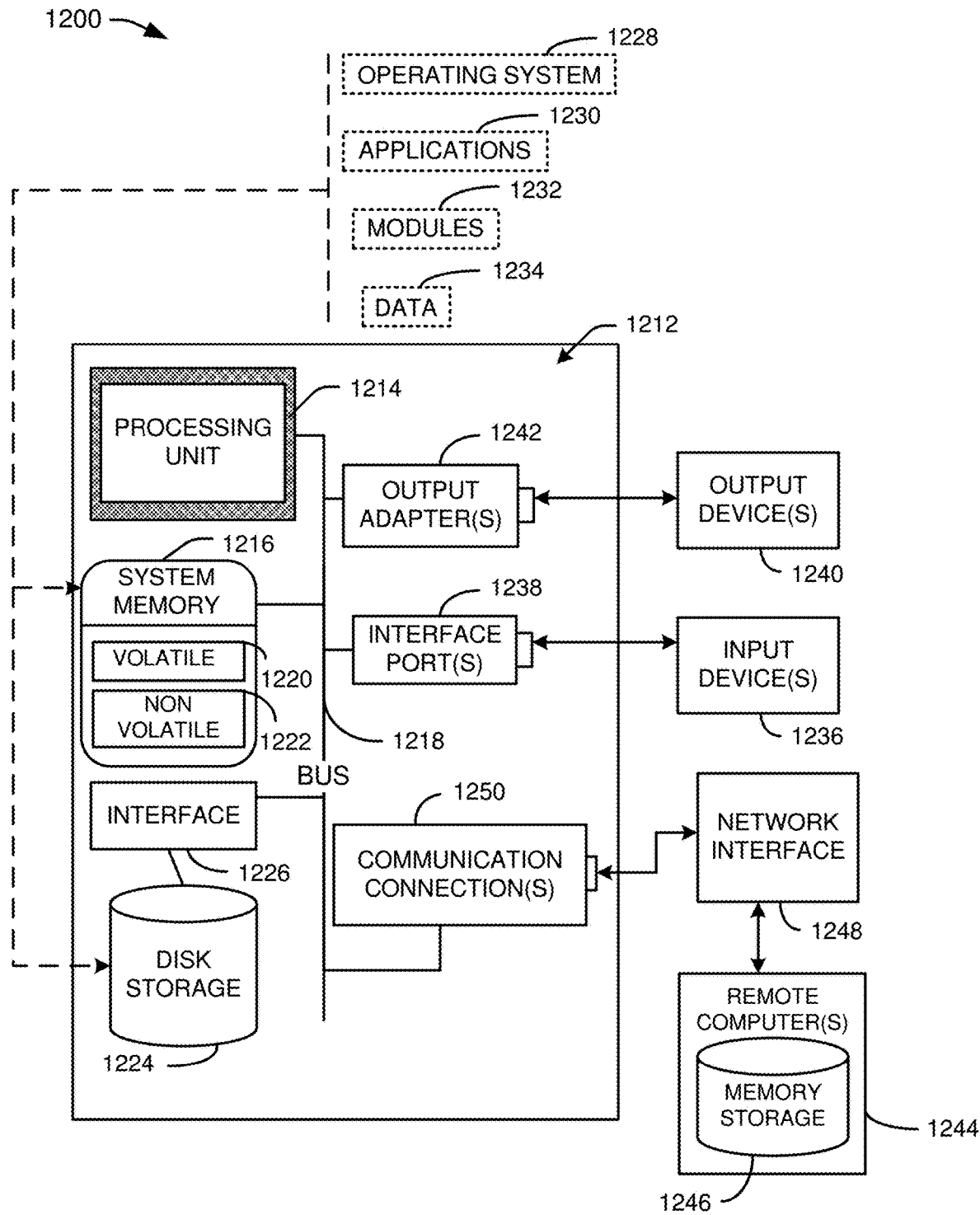
FIG. 12 is a block diagram of an example, non-limiting operating environment in which one or more embodiments described herein can be implemented.

In order to provide a context for the various aspects of the disclosed subject matter, FIG. 12 as well as the following discussion are intended to provide a general description of a suitable environment in which the various aspects of the disclosed subject matter can be implemented. FIG. 12 illustrates a block diagram of an example, non-limiting operating environment in which one or more embodiments described herein can be facilitated. Repetitive description of like elements employed in other embodiments described herein is omitted for sake of brevity. With reference to FIG. 12, a suitable operating environment 1200 for implementing various aspects of this disclosure can also include a computer 1212. The computer 1212 can also include a processing unit 1214, a system memory 1216, and a system bus 1218. The system bus 1218 couples system components including, but not limited to, the system memory 1216 to the processing unit 1214. The processing unit 1214 can be any of various available processors. Dual microprocessors and other multiprocessor architectures also can be employed as the processing unit 1214. The system bus 1218 can be any of several types of bus structure(s) including the memory bus or memory controller, a peripheral bus or external bus, and/or a local bus using any variety of available bus architectures including, but not limited to, Industrial Standard Architecture (ISA), Micro-Channel Architecture (MSA), Extended ISA (EISA), Intelligent Drive Electronics (IDE), VESA Local Bus (VLB), Peripheral Component Interconnect (PCI), Card Bus, Universal Serial Bus (USB), Advanced Graphics Port (AGP), Firewire (IEEE 1394), and Small Computer Systems Interface (SCSI). The system memory 1216 can also include volatile memory 1220 and nonvolatile memory 1222. The basic input/output system (BIOS), containing the basic routines to transfer information between elements within the computer 1212, such as during start-up, is stored in nonvolatile memory 1222. By way of illustration, and not limitation, nonvolatile memory 1222 can include read only memory (ROM), programmable ROM (PROM), electrically programmable ROM (EPROM), electrically erasable programmable ROM (EEPROM), flash memory, or nonvolatile random access memory (RAM) (e.g., ferroelectric RAM (FeRAM). Volatile memory 1220 can also include random access memory (RAM), which acts as external cache memory. By way of illustration and not limitation, RAM is available in many forms such as static RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), direct Rambus RAM (DRRAM), direct Rambus dynamic RAM (DRDRAM), and Rambus dynamic RAM.

Computer 1212 can also include removable/non-removable, volatile/nonvolatile computer storage media. FIG. 12 illustrates, for example, a disk storage 1224. Disk storage 1224 can also include, but is not limited to, devices like a magnetic disk drive, solid state drive, floppy disk drive, tape drive, Jaz drive, Zip drive, LS-100 drive, flash memory card, or memory stick. The disk storage 1224 also can include storage media separately or in combination with other storage media including, but not limited to, an optical disk drive such as a compact disk ROM device (CD-ROM), CD recordable drive (CD-R Drive), CD rewritable drive (CD-RW Drive), a digital versatile disk ROM drive (DVD-ROM), or a Blu-ray disc drive. To facilitate connection of the disk storage 1224 to the system bus 1218, a removable or non-removable interface is typically used, such as interface 1226. FIG. 12 also depicts software that acts as an intermediary between users and the basic computer resources described in the suitable operating environment 1200. Such software can also include, for example, an operating system 1228. Operating system 1228, which can be stored on disk storage 1224, acts to control and allocate resources of the computer 1212. System applications 1230 take advantage of the management of resources by operating system 1228 through program modules 1232 and program data 1234, e.g., stored either in system memory 1216 or on disk storage 1224. It is to be appreciated that this disclosure can be implemented with various operating systems or combinations of operating systems. A user enters commands or information into the computer 1212 through input device(s) 1236. Input devices 1236 include, but are not limited to, a pointing device such as a mouse, trackball, stylus, touch pad, keyboard, microphone, joystick, game pad, satellite dish, scanner, TV tuner card, digital camera, digital video camera, web camera, and the like. These and other input devices connect to the processing unit 1214 through the system bus 1218 via interface port(s) 1238. Interface port(s) 1238 include, for example, a serial port, a parallel port, a game port, and a universal serial bus (USB). Output device(s) 1240 use some of the same type of ports as input device(s) 1236. Thus, for example, a USB port can be used to provide input to computer 1212, and to output information from computer 1212 to an output device 1240. Output adapter 1242 is provided to illustrate that there are some output devices 1240 like monitors, speakers, and printers, among other output devices 1240, which require special adapters. The output adapters 1242 include, by way of illustration and not limitation, video and sound cards that provide a means of connection between the output device 1240 and the system bus 1218. It should be noted that other devices and/or systems of devices provide both input and output capabilities such as remote computer(s) 1244.

Computer 1212 can operate in a networked environment using logical connections to one or more remote computers, such as remote computer(s) 1244. The remote computer(s) 1244 can be a computer, a server, a router, a network PC, a workstation, a microprocessor based appliance, a peer device or other common network node and the like, and typically can also include many or all of the elements described relative to computer 1212. For purposes of brevity, only a memory storage device 1246 is illustrated with remote computer(s) 1244. Remote computer(s) 1244 is logically connected to computer 1212 through a network interface 1248 and then physically connected via communication connection 1250. Network interface 1248 encompasses wire and/or wireless communication networks such as local-area networks (LAN), wide-area networks (WAN), cellular networks, etc. LAN technologies include Fiber Distributed Data Interface (FDDI), Copper Distributed Data Interface (CDDI), Ethernet, Token Ring and the like. WAN technologies include, but are not limited to, point-to-point links, circuit switching networks like Integrated Services Digital Networks (ISDN) and variations thereon, packet switching networks, and Digital Subscriber Lines (DSL). Communication connection(s) 1250 refers to the hardware/software employed to connect the network interface 1248 to the system bus 1218. While communication connection 1250 is shown for illustrative clarity inside computer 1212, it can also be external to computer 1212. The hardware/software for connection to the network interface 1248 can also include, for exemplary purposes only, internal and external technologies such as, modems including regular telephone grade modems, cable modems and DSL modems, ISDN adapters, and Ethernet cards.

Various embodiments of the present can be a system, a method, an apparatus and/or a computer program product at any possible technical detail level of integration. The computer program product can include a computer readable storage medium (or media) having computer readable program instructions thereon for causing a processor to carry out one or more aspects of the present invention. The computer readable storage medium can be a tangible device that can retain and store instructions for use by an instruction execution device. The computer readable storage medium can be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium can also include the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network can comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device. Computer readable program instructions for carrying out operations of one or more embodiments of the present invention can be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions can execute entirely on the user's computer, partly on the user's computer, as a stand-alone software package, partly on the user's computer and partly on a remote computer or entirely on the remote computer or server. In the latter scenario, the remote computer can be connected to the user's computer through any type of network, including a local area network (LAN) or a wide area network (WAN), or the connection can be made to an external computer (for example, through the Internet using an Internet Service Provider). In some embodiments, electronic circuitry including, for example, programmable logic circuitry, field-programmable gate arrays (FPGA), or programmable logic arrays (PLA) can execute the computer readable program instructions by utilizing state information of the computer readable program instructions to personalize the electronic circuitry, in order to perform one or more aspects of the present invention.

One or more aspects of the present invention are described herein with reference to flowchart illustrations and/or block diagrams of methods, apparatus (systems), and computer program products according to one or more embodiments of the invention. It will be understood that each block of the flowchart illustrations and/or block diagrams, and combinations of blocks in the flowchart illustrations and/or block diagrams, can be implemented by computer readable program instructions. These computer readable program instructions can be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions can also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks. The computer readable program instructions can also be loaded onto a computer, other programmable data processing apparatus, or other device to cause a series of operational acts to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams can represent a module, segment, or portion of instructions, which comprises one or more executable instructions for implementing the specified logical function(s). In some alternative implementations, the functions noted in the blocks can occur out of the order noted in the Figures. For example, two blocks shown in succession can, in fact, be executed substantially concurrently, or the blocks can sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While the subject matter has been described above in the general context of computer-executable instructions of a computer program product that runs on a computer and/or computers, those skilled in the art will recognize that this disclosure also can or can be implemented in combination with other program modules. Generally, program modules include routines, programs, components, data structures, etc. that perform particular tasks and/or implement particular abstract data types. Moreover, those skilled in the art will appreciate that the inventive computer-implemented methods can be practiced with other computer system configurations, including single-processor or multiprocessor computer systems, mini-computing devices, mainframe computers, as well as computers, hand-held computing devices (e.g., PDA, phone), microprocessor-based or programmable consumer or industrial electronics, and the like. The illustrated aspects can also be practiced in distributed computing environments where tasks are performed by remote processing devices that are linked through a communications network. However, some, if not all aspects of this disclosure can be practiced on stand-alone computers. In a distributed computing environment, program modules can be located in both local and remote memory storage devices.

As used in this application, the terms "component," "system," "platform," "interface," and the like, can refer to and/or can include a computer-related entity or an entity related to an operational machine with one or more specific functionalities. The entities disclosed herein can be either hardware, a combination of hardware and software, software, or software in execution. For example, a component can be, but is not limited to being, a process running on a processor, a processor, an object, an executable, a thread of execution, a program, and/or a computer. By way of illustration, both an application running on a server and the server can be a component. One or more components can reside within a process and/or thread of execution and a component can be localized on one computer and/or distributed between two or more computers. In another example, respective components can execute from various computer readable media having various data structures stored thereon. The components can communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software or firmware application executed by a processor. In such a case, the processor can be internal or external to the apparatus and can execute at least a part of the software or firmware application. As yet another example, a component can be an apparatus that provides specific functionality through electronic components without mechanical parts, wherein the electronic components can include a processor or other means to execute software or firmware that confers at least in part the functionality of the electronic components. In an aspect, a component can emulate an electronic component via a virtual machine, e.g., within a cloud computing system.

In addition, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. Moreover, articles "a" and "an" as used in the subject specification and annexed drawings should generally be construed to mean "one or more" unless specified otherwise or clear from context to be directed to a singular form. As used herein, the terms "example" and/or "exemplary" are utilized to mean serving as an example, instance, or illustration. For the avoidance of doubt, the subject matter disclosed herein is not limited by such examples. In addition, any aspect or design described herein as an "example" and/or "exemplary" is not necessarily to be construed as preferred or advantageous over other aspects or designs, nor is it meant to preclude equivalent exemplary structures and techniques known to those of ordinary skill in the art.

As it is employed in the subject specification, the term "processor" can refer to substantially any computing processing unit or device comprising, but not limited to, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components, or any combination thereof designed to perform the functions described herein. Further, processors can exploit nano-scale architectures such as, but not limited to, molecular and quantum-dot based transistors, switches and gates, in order to optimize space usage or enhance performance of user equipment. A processor can also be implemented as a combination of computing processing units. In this disclosure, terms such as "store," "storage," "data store," data storage," "database," and substantially any other information storage component relevant to operation and functionality of a component are utilized to refer to "memory components," entities embodied in a "memory," or components comprising a memory. It is to be appreciated that memory and/or memory components described herein can be either volatile memory or nonvolatile memory, or can include both volatile and nonvolatile memory. By way of illustration, and not limitation, nonvolatile memory can include read only memory (ROM), programmable ROM (PROM), electrically programmable ROM (EPROM), electrically erasable ROM (EEPROM), flash memory, or nonvolatile random access memory (RAM) (e.g., ferroelectric RAM (FeRAM). Volatile memory can include RAM, which can act as external cache memory, for example. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), direct Rambus RAM (DRRAM), direct Rambus dynamic RAM (DRDRAM), and Rambus dynamic RAM (RDRAM). Additionally, the disclosed memory components of systems or computer-implemented methods herein are intended to include, without being limited to including, these and any other suitable types of memory.

What has been described above include mere examples of systems and computer-implemented methods. It is, of course, not possible to describe every conceivable combination of components or computer-implemented methods for purposes of describing this disclosure, but one of ordinary skill in the art can recognize that many further combinations and permutations of this disclosure are possible. Furthermore, to the extent that the terms "includes," "has," "possesses," and the like are used in the detailed description, claims, appendices and drawings such terms are intended to be inclusive in a manner similar to the term "comprising" as "comprising" is interpreted when employed as a transitional word in a claim. The descriptions of the various embodiments have been presented for purposes of illustration, but are not intended to be exhaustive or limited to the embodiments disclosed. Various modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A system comprising:
   a memory that stores computer executable components; and
   a processor that executes the computer executable components stored in the memory, wherein the computer executable components comprise:
      a reduction component that reduces, in polynomial time, a first computing problem of a problem type to a second computing problem of the problem type, wherein the first computing problem is a non-3-satisfiability problem that is not executable by a quantum circuit, and the second computing problem a 3-satisfiability problem that is executable by the quantum circuit;

an execution component that facilitates execution of the second computing problem by the quantum circuit at a quantum computer, the execution of the quantum circuit resulting in a second output corresponding to the second computing problem; and an output mapping component that transforms the second output to a first output corresponding to the first computing problem based on a reduction mapping previously employed to transform a first input set for the first computing problem to a second input set for the second computing problem.

2. The system of claim 1, wherein the problem type belongs to a class in which respective problems of the class are reducible to each other.

3. The system of claim 2, wherein the problem type is a nondeterministic polynomial (NP)-complete problem type.

4. The system of claim 1, wherein the computer executable components further comprise:

an input mapping component that transforms a first input of the first input set to a second input of the second input set based on the reduction mapping, wherein the input mapping component facilitates generation of the second input independently of a level of knowledge of the second computing problem by a user of the system.

5. The system of claim 4, wherein the computer executable components further comprise:

a construction component that generates configuration data for construction of the quantum circuit by the quantum computer, wherein the quantum circuit comprises an oracle marking subcircuit and an amplitude amplification subcircuit.

6. The system of claim 5, wherein the construction component generates configuration data for the oracle marking subcircuit by converting respective elements of the second computing problem via at least one of Pauli-X quantum gates or N-th order controlled-not (CNX) quantum gates.

7. The system of claim 6, wherein the construction component generates configuration data for a CNX quantum gate by combining a number N of controlled-controlled-not (CCX) quantum gates and respectively corresponding ancillary qubits.

8. The system of claim 5, wherein the construction component generates configuration data for the amplitude amplification subcircuit based on a transformation matrix.

9. The system of claim 1, further comprising a quantum code generator component that generates a quantum program to solve the 3-satisfiability problem.

10. A computer-implemented method comprising:

reducing, by a device operatively coupled to a processor, in polynomial time, a first computing problem of a problem type to a second computing problem of the problem type, wherein the first computing problem is a non-3-satisfiability problem that is not executable by a quantum circuit, and the second computing problem a 3-satisfiability problem that is executable by the quantum circuit;

facilitating, by the device, execution of the second computing problem by the quantum circuit at a quantum computer, resulting in a second output corresponding to the second computing problem; and transforming, by the device, the second to a first output corresponding to the first computing problem based on a mapping of a first input set for the first computing problem to a second input set for the second computing problem.

11. The computer-implemented method of claim 10, wherein the problem type belongs to a class in which respective problems of the class are reducible to each other.

12. The computer-implemented method of claim 10, further comprising:

transforming, by the device, a first input of the first input set to a second input of the second input set.

13. The computer-implemented method of claim 12, further comprising:

generating, by the device, configuration data for construction of the quantum circuit by the quantum computer, wherein the quantum circuit comprises an oracle marking subcircuit and an amplitude amplification subcircuit.

14. The computer-implemented method of claim 13, further comprising:

generating, by the device, configuration data for the oracle marking subcircuit by converting respective elements of the second computing problem via at least one of Pauli-X quantum gates or N-th order controlled-not (CNX) quantum gates.

15. The computer-implemented method of claim 13, further comprising:

generating, by the device, configuration data for the amplitude amplification subcircuit based on a transformation matrix.

16. The computer-implemented method of claim 10, further comprising:

generating, by the device, a quantum program to solve the 3-satisfiability problem.

17. A computer program product for facilitating quantum programming, the computer program product comprising a computer readable storage medium having program instructions embodied therewith, the program instructions executable by a processor to cause the processor to:

reduce, in polynomial time, a first computing problem of a problem type to a second computing problem of the problem type, wherein the first computing problem is a non-3-satisfiability problem that is not executable by a quantum circuit, and the second computing problem a 3-satisfiability problem that is executable by the quantum circuit;

facilitate execution of the second computing problem by the quantum circuit at a quantum computer, resulting in a second output corresponding to the second computing problem; and map the second to a first output corresponding to the first computing problem based on a mapping of a first input set for the first computing problem to a second input set for the second computing problem.

18. The computer program product of claim 17, wherein the problem type belongs to a class in which respective problems of the class are reducible to each other.

19. The computer program product of claim 17, wherein the program instructions further cause the processor to:

transform a first input of the first input set to a second input of the second input set based on the reduction mapping.

20. The computer program product of claim 17, wherein the program instructions further cause the processor to:

generate a quantum program to solve the 3-satisfiability problem.

* * * * *